(12) United States Patent
Socher et al.

(10) Patent No.: US 11,113,598 B2
(45) Date of Patent: Sep. 7, 2021

(54) DYNAMIC MEMORY NETWORK

(71) Applicant: salesforce.com, inc., San Francisco, CA (US)

(72) Inventors: Richard Socher, Menlo Park, CA (US); Ankit Kumar, San Diego, CA (US); Ozan Irsoy, Ithaca, NY (US); Mohit Iyyer, Burke, VA (US); Caiming Xiong, Palo Alto, CA (US); Stephen Merity, San Francisco, CA (US); Romain Paulus, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 892 days.

(21) Appl. No.: 15/221,532

(22) Filed: Jul. 27, 2016

(65) Prior Publication Data

US 2017/0024645 A1 Jan. 26, 2017

Related U.S. Application Data

(63) Continuation-in-part of application No. 15/170,884, filed on Jun. 1, 2016, now abandoned.

(60) Provisional application No. 62/236,119, filed on Oct. 1, 2015, provisional application No. 62/169,190, filed on Jun. 1, 2015.

(51) Int. Cl.
*G06N 3/08* (2006.01)
*G06N 3/04* (2006.01)
*G06F 16/33* (2019.01)
*G06F 16/332* (2019.01)

(52) U.S. Cl.
CPC ............ *G06N 3/08* (2013.01); *G06F 16/3329* (2019.01); *G06F 16/3347* (2019.01); *G06N 3/0427* (2013.01); *G06N 3/0445* (2013.01)

(58) Field of Classification Search
CPC ...... G06N 3/0445; G06N 3/0427; G06N 3/08; G06N 5/04; G06F 17/30654
See application file for complete search history.

(56) References Cited

U.S. PATENT DOCUMENTS

| | | | |
|---|---|---|---|
| 9,336,268 B1 | 5/2016 | Moudy et al. | |
| 10,282,663 B2 | 5/2019 | Socher et al. | |
| 10,346,721 B2 | 7/2019 | Albright et al. | |
| 2013/0002553 A1 | 1/2013 | Colley | |
| 2015/0052087 A1 | 2/2015 | Srinivasan et al. | |
| 2015/0220643 A1 | 8/2015 | Alba et al. | |
| 2016/0034809 A1 | 2/2016 | Trenholm et al. | |

(Continued)

OTHER PUBLICATIONS

Gao et al ("Are You Talking to a Machine? Dataset and Methods for Multilingual Image Question Answering", arXiv:1505.05612v1 [cs.CV], https://arxiv.org/abs/1505.05612, May 21, 2015, pp. 1-10) (Year: 2015).*

(Continued)

*Primary Examiner* — Kakali Chaki
*Assistant Examiner* — Robert Lewis Kulp
(74) *Attorney, Agent, or Firm* — Haynes and Boone, LLP

(57) ABSTRACT

A novel unified neural network framework, the dynamic memory network, is disclosed. This unified framework reduces every task in natural language processing to a question answering problem over an input sequence. Inputs and questions are used to create and connect deep memory sequences. Answers are then generated based on dynamically retrieved memories.

23 Claims, 17 Drawing Sheets

(56) References Cited

U.S. PATENT DOCUMENTS

| | | |
|---|---|---|
| 2016/0132749 A1 | 5/2016 | Smyth et al. |
| 2016/0300135 A1 | 10/2016 | Moudy et al. |
| 2016/0342895 A1 | 11/2016 | Gao et al. |
| 2016/0350653 A1 | 12/2016 | Socher et al. |

OTHER PUBLICATIONS

Chung et al. ("Empirical Evaluation of Gated Recurrent Neural Networks on Sequence Modeling", asXiv preprint arXiv:1412.3555v1, Dec. 11, 2014, pp. 1-9) (Year: 2014).*
Karpathy et al. ("Deep Visual-Semantic Alignments for Generating Image Descriptions", asXiv arXiv: 1412.2306, Apr. 14, 2015, pp. 1-17) (Year: 2015).*
Schuster et al. ("Bidirectional Recurrent Neural Networks", IEEE Trans on Signal Processing, vol. 45, No. 11, Nov. 1997, pp. 26732-681) (Year: 1997).*
Gers et al. ("Learning to Forget: Continual Prediction with LSTM", Proc ICANN 99, p. 850-855, 1999) (Year: 1999).*
Rhaman ("Recurrent Neural Network Classifier for Three Layer Conceptual Network and Performance Evaluation", Journal of Computers, vol. 5, No. 1, Jan. 2010, pp. 40-48) (Year: 2010).*
Graves et al. ("Hybrid Speech Recognition with Deep Bidirectional LSTM", Automatic Speech Recognition and Understanding (ASRU), 2013 IEEE Workshop on, pp. 1-5) (Year: 2013).*
Socher et al. ("Reasoning With Neural Tensor Networks for Knowledge Base Completion", in Advances in Neural Information Processing Systems 26, Red Hook, NY, USA, Curran, 2013), (Year: 2013).*
Chung et al. ("Empirical Evaluation of Gated Recurrent Neural Networks on Sequence Modeling", asXiv preprint arXiv:1412.3555v1, Dec. 11, 2014, pp. 1-9) (Year: 2014).*
Cho et al. ("On the Properties of Neural Machine Translation: Encoder-Decoder Approaches", Proceedings of SSST-8, Eighth Workshop on Syntax, Semantics, and Structure in Statistical Translation, Oct. 25, 2014, pp. 103-111) (Year: 2014).*
Vinyals et al. ("Show and Tell: A Neural Image Caption Generator", arXiv:1411.4555v1 [cs.CV] Nov. 17, 2014, pp. 1-9), (Year: 2014).*
Karpathy et al. ("Deep Visual-Semantic Alignments for Generating Image Descriptions", asXiv preprint arXiv:1412.2306, Apr. 14, 2015, pp. 1-17), (Year: 2015).*
Sukhbaatar et al. ("Weakly Supervised Memory Networks", arXiv:1503.08895v3 [cs.NE], https://arxiv.org/abs/1503.08895, Apr. 12, 2015, pp. 1-9), (Year: 2015).*
Gao ("Are You Talking to a Machine? Dataset and Methods for Multilingual Image Question Answering", arXiv:1505.05612v1 [cs.CV], https://arxiv.org/abs/1505.05612, May 21, 2015, pp. 1-10), (Year: 2015).*
Weston et al ("Memory Networks", arXiv:1410.3916v1 [cs.AI], https://arxiv.org/abs/1410.03916, May 19, 2015, pp. 1-15) (Year: 2015).*
Bordes et al., "Joint Learning of Words and Meaning Representations for Open-Text Semantic Parsing," Appearing in Proceedings of the 15th International Conference on Artificial Intelligence and Statistics. La Palma, Canary Islands. Apr. 21-23, 2012. pp. 1-9.
Bordes et al., "Learning Structured Embeddings of Knowledge Bases," Association for the Advancement of Artificial Intelligence. San Francisco, CA. Apr. 7-11, 2011. pp. 1-6.
Cho et al., "On the Properties of Neural Machine Translation: Encoder-Decoder Approaches," Proceedings of SSST-8, Eighth Workshop on Syntax, Semantic and Structure in Statistical Translation. Doha, Qatar. Oct. 25, 2014. pp. 1-9.
Chung et al., "Empirical Evaluation of Gated Recurrent Neural Networks on Sequence Modeling," Presented in Neural Information Processing Systems: Deep Learning and Representation Workshop. Montréal, Canada. Dec. 8-13, 2014. pp. 1-9.
Dusek et al., "The Hippocampus and Memory for Orderly Stimulus Relations," Proceedings of the National Academy of Science, vol. 94. Boston, MA. Jun. 24, 1997. pp. 1-6.

Elman, "Distributed Representations, Simple Recurrent Networks, and Grammatical Structure," Machine Learning, vol. 7. Kluwer Academic Publishers. Boston, MA. 1991. pp. 1-31.
Heckers et al., "Hippocampal Activation During Transitive Inference in Humans," Hippocampus, vol. 14. 2004. pp. 4-10. https://pdfs.semanticscholar.org/e611/5db37cd8531f211bf9d4408e6baf26d632e4.pdf.
Hochreiter et al., "Long Short-Term Memory: Neural Computation," Neural Computation, vol. 9, Issue 8. Nov. 15, 1997. pp. 1-32.
Mikolov et al., "Efficient Estimation of Word Representations in Vector Space," International Conference on Learning Representation. Scottsdale, Arizona. Jan. 16, 2013. pp. 1-12.
Pennington et al., "GloVe: Global Vectors for Word Representation," Proceedings of the 2014 Conference on Empirical Methods in Natural Language Processing. Doha, Qatar. Oct. 25-29, 2014. pp. 1-12.
Socher et al., "Recursive Deep Models for Semantic CompositionalityOver a Sentiment Treebank," Conference on Empirical Methods in Natural Language Processing, Seattle, USA. Oct. 18-21, 2013. pp. 1-12.
Xu et al., "Show, Attend and Tell: Neural Image Caption Generation with Visual Attention," International Conference on Machine Learning, vol. 37. Lille, France. Jul. 6-11, 2015. pp. 1-22.
Xiong et al., "Dynamic Memory Networks for Visual and Textual Question Answering," Mar. 4, 2016, MetaMind, Palo Alto, CA USA, 10 pages.
Stollenga et al., "Deep Networks with Internal Selective Attention through Feedback Connections," Jul. 28, 2014, ICML, 13 pages.
Socher, "Deep NLP Applications and Dynamic Memory Network," Aug. 11, 2015, MetaMind Lecture, 46 pages.
Sutskever et al., "Sequence to Sequence Learning with Neural Networks," Dec. 14, 2014, Google, 9 pages.
Kumar et al., "Ask Me Anything: Dynamic Memory Networks for Natural Language Processing," Jun. 24, 2015, MetaMind, Palo Alto, CA, 10 pages.
Weston et al., "Memory Networks," Nov. 29, 2015, Conference paper at ICLR 2015, 15 pages.
Tai et al., Improved Semantic Representations From Tree-Structured Long Short-Term Memory Networks, May 30, 2015, Computer Science Department, Stanford University, MetaMind Inc., 11 pages.
Cho et al., "Learning Phrase Representations using RNN Encoder-Decoder for Statistical Machine Translation," Sep. 13, 2014, Université de Montréal, Jacobs University, Germany, Université du Maine, France, Université de Montréa;, CIFAR Senior Fellow, 15 pages.
Gers et al., "Learning to Forget: Continual Prediction with LSTM," Jan. 1999, Technical Report IDSIA-01-99, 19 pages.
Kumar et al., "Ask Me Anything: Dynamic Memory Networks for Natural Language Processing," Mar. 5, 2016, MetaMind, Palo Alto, CA, 10 pages.
Socher et al., "Reasoning With Neural Tensor Networks for Knowledge Base Completion", Computer Science Dept., Stanford University, Stanford, CA, USA 2013, 10 pages.
Bandanau et al., "Neural Machine Translation by Jointly Learning to Align and Translate," Publlished as a Conference Paper in ICLR 2015, arXiv:1409.0473v6, 2015, pp. 1-15. 2015.
Chrupala, "Normalizing Tweets with Edit Scripts and Recurrent Neural Embeddings", Tilburg University, Proceedings of the 22nd Annual Meeting of the Association for Computational Linguistics (Short Papers), Baltimore, Maryland, Jun. 23-25 2014, pp. 680-686. 2014.
Khosla et al., "What Makes an Image Popular?," International World Wide Web Conference Committee, WWW' 14, Apr. 7-11, 2014, Seoul, Korea, pp. 867-876. 2014.
Li et al., "Visualizing and Understanding Neural Models in NLP," arXiv:1506.01066v1, 2015, pp. 1-10. 2015.
Li et al., "Visualizing and Understanding Neural Models in NLP," arXiv:1506.01066v2, 2016, pp. 1-10. 2016.
Mao et al., "Deep Captioning with MultiModal Recurrent Neural Networks (m-RNN)," ICLR 2015, May 7-9, 2015, pp. 1-15. 2015.
Mroueh et al., "Deep Multi-Modal Learning for Audio-Visual Speech Recognition," IBM research center, 2015, pp. 1-8. 2015.

(56) References Cited

OTHER PUBLICATIONS

Reisberg The Oxford Handbook of Cognitive Psychology, Oxford University Press 2013 2013.
Uddin et al., "Understanding Types of Users on Twitter", Qatar Computing Research Institute, 2014, pp. 1-6. 2014.
Weston et al., "Towards AI-Complete Question Answering: A Set of Prerequisite Toy Tasks," arXiv: 1502.056985v5, 2015, pp. 1-10. 2015.
Zeiler et al., "Visualizing and Understanding Convolutional Networks," NYU, arXiv1311.2901v3, 2013, pp. 1-11. 2013.

* cited by examiner

200A

210 I: Jane is a woman and John is a man.
211 I: Jane and John are a couple.
212 I: Their baby is born in Dresden.
220 Q: Their?
230 A: Jane and John
221 Q: What's the sentiment of "Everybody is excited for them."
231 A: positive
222 Q: Where is John's baby born?
232 A: Dresden
223 Q: Who are the people?
233 A: Jane, John.
224 Q: What are the named entities in: "Jane has a baby in Dresden."
234 A: Jane - person, Dresden - location
225 Q: What are the POS tags of: "Jane has a baby in Dresden."
235 A: DT DT NP ...
226 Q: Translate to French: "I think this model is incredible"
236 A: Je pense que ce modle est incroyable.

242 I: Mary walked to the bathroom.
244 I: Sandra went to the garden.
246 I: Daniel went back to the garden.
248 I: Sandra took the milk there.
250 Q: Where is the milk?
252 A: garden

510 I: Swans are grey.
511 I: Hummingbirds are green and blue.
512 I: John is a swan.
513 I: John lives in California in the summer.
520 Q: What color is John?
530 A: John is grey.

Fig. 5

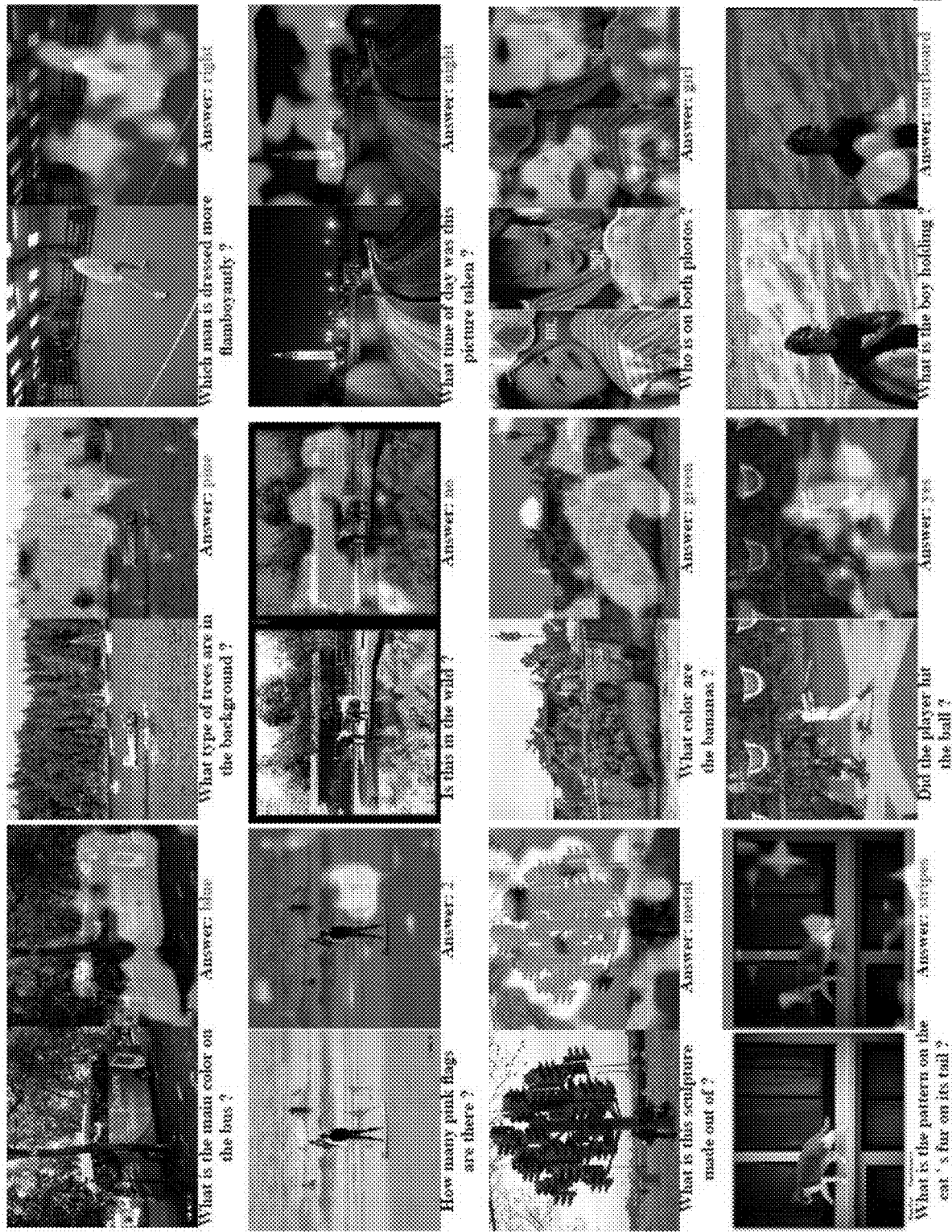

DYNAMIC MEMORY NETWORK

RELATED APPLICATIONS

This application is a continuation-in-part of U.S. patent application Ser. No. 15/170,884, entitled "Dynamic Memory Network", filed on 1 Jun. 2016, which claims the benefit of U.S. Provisional Patent Application No. 62/169,190, entitled, "DYNAMIC MEMORY NETWORK," filed on 1 Jun. 2015. This application also claims the benefit of U.S. Provisional Patent Application No. 62/236,119, entitled "Engagement Estimator", filed 1 Oct. 2015 and U.S. Provisional Patent Application No. 62/197,428, entitled "Recursive Deep Learning", filed 27 Jul. 2016. The provisional applications are hereby incorporated by reference for all purposes.

FIELD OF THE TECHNOLOGY DISCLOSED

The present invention relates to networks, and more particularly to deep learning in memory networks.

BACKGROUND

Machine learning is a field of study that gives computers the ability to learn without being explicitly programmed, as defined by Arthur Samuel. As opposed to static programming, machine learning algorithms use data to make predictions. Deep learning is a form of machine learning that models high level abstractions in data by layers of low level analytics of that data.

A machine learning system may be implemented as a set of learning machines. Learning machines may perform a variety of different tasks on input data. For example, for a text-based input, a learning machine may identify and tag the parts of speech (POS), and use that for identification of a proper noun or noun phrase. Another learning machine may review the input text and identify named entities, such as city names. Yet another learning machine may perform sentiment analysis to determine whether the input is negative or positive or a gradient in-between.

In the prior art, these different tasks performed by learning machines required different types of algorithms and training to perform. For example, inputting a statement into a sentiment analysis learning machine yields a word cloud identifying positive and negative associated words and an intelligent guess as to the overall sentiment of the statement. However, that sentiment analysis learning machine cannot do other types of analysis on the statement. It is labor intensive to write algorithms for each type of task and train on application specific data sets for each of these tasks.

It is desirable to have real world applications with a question answering format. However, question answering is one of the most complex natural language processing tasks, since it requires a deep understanding of the meaning of language and its connections to memory and inference over knowledge. Existing implementations of learning machines for each type of task have been limited in the real world context due to the need for different tools to accomplish different application specific tasks. Despite the need for a broader applicability and generality of learning machine tasks, and for many years, learning machines were customized for each type of analysis and created separately, because the learning algorithms and training data sets were based on the subject matter.

BRIEF DESCRIPTION OF THE FIGURES

The present invention is illustrated by way of example, and not by way of limitation, in the figures of the accompanying drawings and in which like reference numerals refer to similar elements and in which:

FIG. 2A is an exemplary stream of information, questions, and answers, in accordance with one embodiment of the present invention.

FIG. 2B is an exemplary stream of information, questions, and answers, in accordance with one embodiment of the present invention.

FIG. 5 is another exemplary stream of information, questions, and answers, in accordance with one embodiment of the present invention.

FIG. 16 illustrates exemplary qualitative results of attention for a particular DMN embodiment performing visual question answering (VQA).

DETAILED DESCRIPTION

Figure 1:
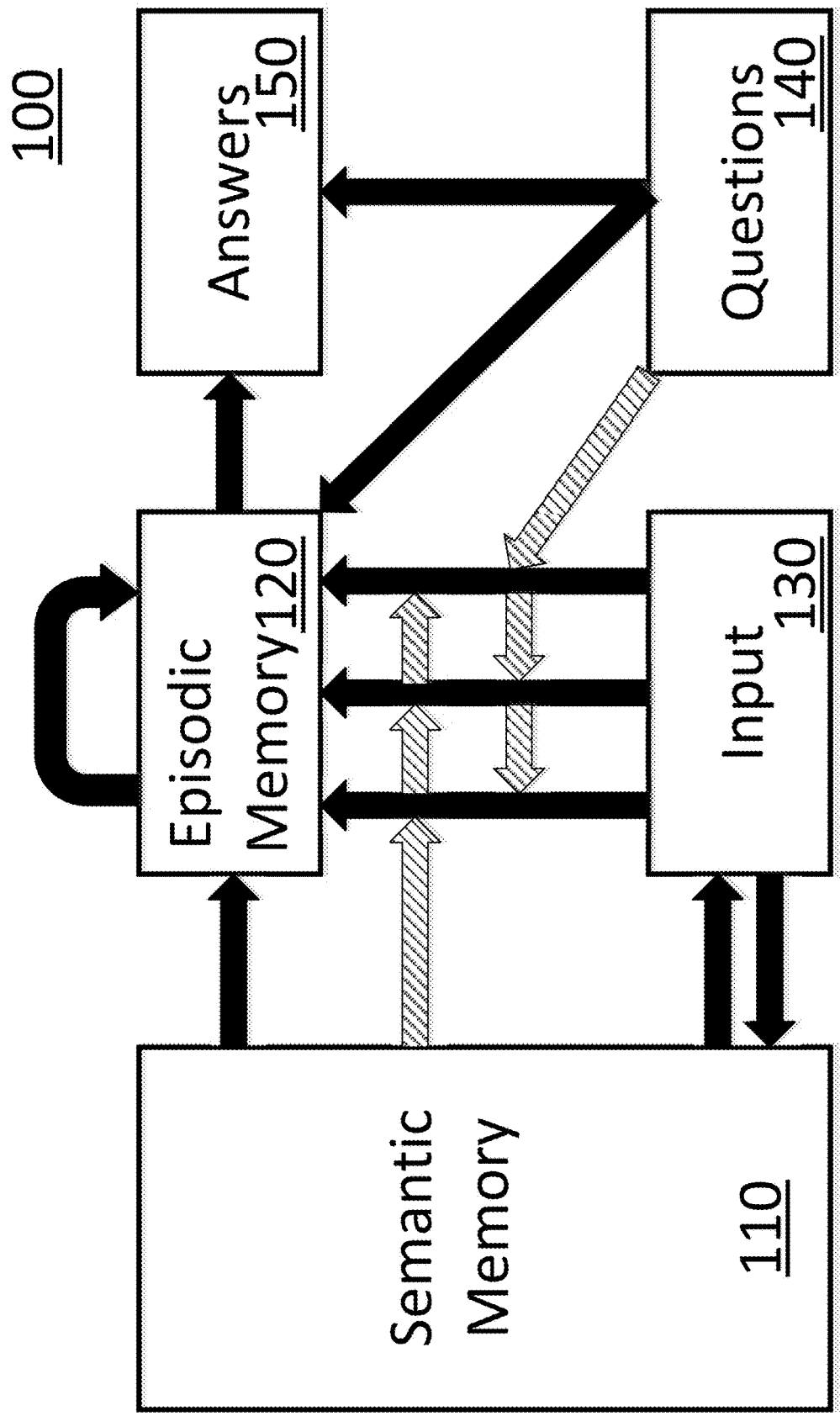
FIG. 1 is a block diagram of one embodiment of a Dynamic Memory Network.

A unified neural network framework is described which processes input and question sequences, forms episodic and semantic memories, and produces relevant answer sequences. This framework will be referred to as the Dynamic Memory Network (DMN). Questions trigger an attention and retrieval process over facts from the input which are stored as memories. These memories are connected and reasoned over in deep, hierarchical recurrent sequences to generate answers. The DMN can be trained end-to-end. The DMN learning machine reduces a variety of tasks to a question answering problem over an input sequence, to enable the DMN system to accept any question, and provide an answer.

The DMN has been tested for a variety of tasks against state of the art application specific learning machines, and obtains state of the art results. For example, in comparison to babI by FACEBOOK and BioProcess by STANFORD UNIVERSITY, the DMN was state of the art without requiring any string matching or other manually engineered features as found in existing learning machines.

For natural language processing (NLP), inputs and questions are used to create and connect deep memory sequences. Answers are then generated based on dynamically retrieved memories. For NLP tasks, the DMN provides a unified framework question and answer process which enables the use of the same framework for a variety of tasks, such as part of speech (POS) tagging, named entity recognition, sentiment analysis, co-reference resolution and machine translation. Each of these tasks may be evoked within the DMN with a question, such as "What is the translation into French?", "What is the sentiment?", or "Who does 'their' refer to?".

While it may seem trivial to recast existing tasks in a learning system as a question and an answer, in reality this recasting of a variety of tasks into questions is a novel aspect of the DMN that allows the DMN to answer very complex questions, understanding the meaning of language and inference over knowledge. For example, the DMN can take a large body of text and answer a multi-layered question such as "Where was Obama's wife born?" Such a complex question requires utilizing a variety of NLP tasks, such as determining within the text the identity of Obama, the identity of Obama's wife, geographic locations relevant to Obama's wife, the date and time of her birth and the geographic location associated with her at that date and time.

In various embodiments, the DMN can be used to provide a unified framework in analyzing audio, video, or other types of data, along multiple dimensions, and without requiring multiple separate training sets and learning machines.

Machine learning may be accomplished by a variety of techniques, such as supervised learning, unsupervised learning, and reinforcement learning. Supervised learning trains a machine with multiple labeled examples. After training, the machine can receive an unlabeled input and label it. Each such label has a confidence rating, in one embodiment. The confidence rating reflects how certain the DMN is in the correctness of that label. Machines trained by unsupervised learning receive a set of data and then analyze that data for patterns. Machines trained by reinforcement learning make decisions and receive feedback as to whether a decision is right or wrong, and are trained by this feedback. The system may combine one or more of the above techniques for machine learning.

FIG. 1 is a block diagram of one embodiment of a DMN 100 in accordance with the present invention. In this embodiment, DMN 100 structures data as information, questions and answers. Input module 130 is responsible for computing representations of raw inputs, such as training and data input, such that they can be retrieved when later needed. Input module 130 these representations to semantic memory 110 and episodic memory 120. In one embodiment, inputs are structured as a temporal sequence indexable by a time stamp. For example, for video input, this would be an image at each time step. As another example, for written language, there would be a sequence of $T_w$ words $v_1, \ldots, v_{T_w}$. In one embodiment, DMN uses both unsupervised and supervised learning in order to compute a useful input representation. In one embodiment, DMN computes both context-independent and context dependent hidden states. Input module 130 processes raw inputs and maps them into a representation that is useful for asking questions about this input. The raw inputs may be in any form, for example, visual input, speech input or text input. In one embodiment, input module 130 converts arbitrary natural language input sequences into useful computer understandable retrievable representations. In another embodiment, input module 130 converts audio input into useful computer understandable retrievable representations.

In one embodiment, as text is read in, semantic memories are built in semantic memory 110 over concepts found in the text. Examples texts are one or more of a long story, a movie review, one or more news articles, or some or all of Wikipedia in one or more languages. In one embodiment, training and data input are represented in vector form. For example, the text input is in the form of sequences of words and the representations that are being computed are semantic vectors at every time step. In one embodiment, communication between elements of DMN 100 uses only semantic vector representation. In one embodiment, an entire language corpus is used to compute sematic word vectors, e.g. using the GloVe model, resulting in context-independent, unsupervised representations at each time step. After computer understandable retrievable representations have been made, the appropriate representation can be used to process further DMN tasks. For example, in NLP, after semantic word vectors are computed, then each word sequence may be described in terms of a list of corresponding word vectors $v_t$ at each time step t. These word vectors may be stored in semantic memory 110.

Memories 110 and 120 may be a separate memory structure, separate databases, separate storages, or a single memory (structure, database, or storage), or a distributed memory. Memories 110 and 120 are functionally structured similarly to the cognitive neuroscience understanding of brain functionality.

In one embodiment, semantic memory 110 is stores general world knowledge about concepts and facts that have been acquired. Example of semantic memories are types of food, capital cities, and functions of objects, such as defining a "hang glider". Such memories remain consistent over time, and are identified based on context, but do not need context for meaning. A "chocolate cake" is always a chocolate cake, whether it is introduced in the context of a recipe or the context of a wedding. Distributed word vector representations, for example, GloVe and Word2Vec, may form the basis of semantic memory. More complex information may be stored in the form of knowledge bases which capture relationships between various words. In one embodiment, this relationship is captured in the form of triplets. For example, a relationship triplet may be of the form (dog, has-part, tail) to represent that things of the type dog have a relationship to things that are of the type tail, and that relationship is that a portion of a dog body part is called a tail.

In NLP, semantic memory consists of stored word concepts and facts about those word concepts. In one embodiment, word concepts are stored in the form of word vectors. In one embodiment, these word vectors are learned while input is being processed in the input module 130. In one embodiment, facts about the word concepts are stored in an embedded knowledge base. The knowledge base may include tables with single facts, for example one or more of lists of city names, lists of names of peoples, and relationship triplets. In one embodiment, semantic memory 110 trains a max-margin objective similar to that described in the published paper "Reasoning With Neural Tensor Networks for Knowledge Base Completion" In Advances in Neural Information Processing Systems, pp. 926-934, 2013, which is incorporated in full herein by reference, to distinguish true facts from false facts.

Episodic memory 120 represents the memory of experiences, times, places, and events in time in their temporal and autonoetic context. In one embodiment, episodic memory 120 is created in a serial form. From that form, reconstruction of the events that have taken place can be made. In one context, John may be a swan. In another context, John may be a baker. In one embodiment, questions trigger gates which allow some input, such as words or sentences, to be passed from semantic memory 110 to episodic memory 120. Similarly, interpretation of the data in episodic memory 120 may be made based on information from the semantic memory.

In one embodiment, episodic memory 120 receives outputs from semantic memory 110, input module 130 and questions module 140 and operates on them to provide the resulting knowledge to answers module 150.

Each question from questions module 140 may draw attention to specific facts from the input sequence in input module 130. Those specific facts from the input sequence may then be stored in episodic memory 120. In answering a question, episodic memory 120 may take several passes over those stored input sequences. Each pass over stored input sequences is called an episode. Additional input sequences may be identified and incorporated into episodic memory 120 based on inferences gleaned in an episode. For example, information gleaned in an episode may identify connections which trigger the retrieval of new facts which were previously thought to not be relevant to an answer. In one embodiment, episodic memory 120 is a hierarchical, recurrent, neural sequence model which collects, stores and reasons over facts.

Questions module 140 computes a representation of a question, such as "Where did the author first fly?" In one embodiment, this representation is in the form of a vector. In one embodiment, this vector representation triggers a gated attention and retrieval process over facts from the input sequence. In one embodiment, questions module 140 is contained within input module 130.

Answers module 150 provides answers to questions in a form appropriate to each question. For example, if a question is about word or sentence level labels, such as named entity tags, then answers module 150 may provide an output at every step of an episodic memory sequence. For tasks that are not sequence labeling, then answers module 150 may provide answers based on the final hidden representation of episodic memory 120.

Neural Networks

Figure 4:
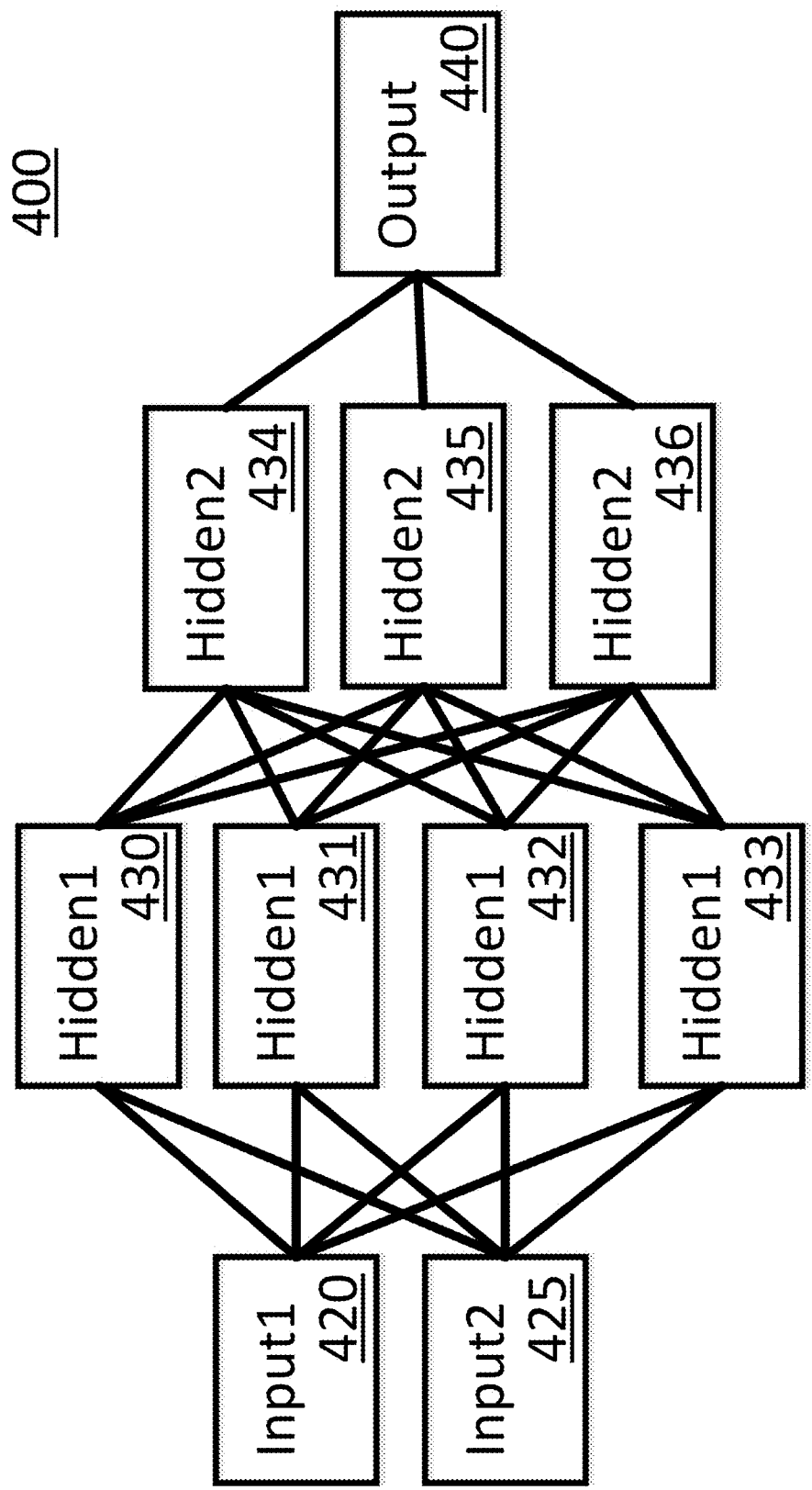
FIG. 4 is a block diagram of one embodiment of a simple two-layer neural network.

In one embodiment, learning machines utilize a neural network for decision making. FIG. 4 is a block diagram of one embodiment of a neural network with two hidden layers. First hidden layer elements 430, 431, 432 and 433 analyze inputs 420 and 425, each with a different focus. Second hidden layer elements 434, 435 and 436 analyze information from first hidden layer elements 430-433, each with a different focus at a higher level of abstraction than the first hidden layer elements. Output 440 is created from this higher level of abstraction from second hidden layer elements 434-436. For example, if first input 420 is a picture of a duck, then first hidden layer 430 may extract straight edges and first hidden layer 431 may extract rounded edges. These straight edges and round edges are features of input 420 that have been extracted by first hidden layers 430 and 431.

Second hidden layer 434 may identify a rounded edge of first hidden layer 431 as an eye and second hidden layer 435 may identify a collection of straight edges from first hidden layer 430 as a beak. The eye and the beak are features of input 420 at a higher level of abstraction than at hidden layers 430 and 431. Output 440 may identify first input 420 as a duck, due to the proximity of the eye identified by second hidden layer 434 and beak identified by second hidden layer 435, from first input 420. Hidden layers 430-436 are considered "hidden" because, while they contribute to output 440, they are not exposed by output 440.

Output 440 uses a feature vector for a duck to make this determination, in one embodiment. A feature vector is a list of associated properties in the form of an n-dimensional vector. In one embodiment, this n-dimensional vector is comprised of numerical values that represent an object, such as the round edges interpreted as eyes that are indicative of a duck. The feature vectors may represent individual features and relationships between features.

Feature values of the feature vector may correspond to, for example, intensity of pixels of an image. For text-based analysis the frequency with which words are associated with other words in a text may be a feature value. The collection of feature vectors, or vector space, associated with these features is called the feature space. Hierarchical concepts may be included in the feature vector. Although FIG. 4 illustrates a two layer neural network, the network used in this system may have an arbitrary number of layers. In one embodiment, the DMN is a multi-layer neural network with at least 2 layers.

In NLP, the feature vector for each word may contain real values. The distribution of all or a portion of these feature vectors may be plotted in vector space to obtain groupings of similar words. These groupings may show consistencies in the relationships between words. For example, plotting dimensions relating the vectors for king, man, and woman in the fashion 'king'−'man'+'woman' is close to the vector for queen. Said another way, the relationship between aspects of the vectors representing the words 'king' and 'queen' is similar to the relationship between aspects of the vectors representing the words 'man' and 'woman'. Similar types of words may have similarly placed vectors, for example, a set of city names may be grouped or clustered in vector space near each other.

A recurrent neural network (RNN) is a multi-layer neural network with the ability to utilize context by maintaining a hidden state analogous to short-term memory that remembers past experiences. When providing a response, the RNN is able include context by basing the analysis on past experience in addition to current input. However, a traditional RNN can forget appropriate context quickly.

A Gated Recurrent Unit (GRU) is part of one type of RNN architecture. One implementation of a GRU for hidden layer units is described by the following equations (input notation changes depending on which type of module is being described). Each timestep has an input $x_t$, a hidden node $h_t$ and potentially an output $y_t$ depending on which module of the DMN is being described.

$$z_t = \sigma(W^{(z)}x_t + U^{(z)}h_{t-1} + b^{(z)}) \qquad \text{Equation (1)}$$

$$r_t = \sigma(W^{(r)}x_t + U^{(r)}h_{t-1} + b^{(r)}) \qquad \text{Equation (2)}$$

$$\tilde{h}_t = \tan h(Wx_t + r_t \circ Uh_{t-1} + b^{(h)}) \qquad \text{Equation (3)}$$

$$h_t = z_t \circ h_{t-1} + (1-z_t) \circ \tilde{h}_t \qquad \text{Equation (4)}$$

wherein t is a time step, $x_t$ is an input at the time step t, $W^{(z)}$, $W^{(r)}$, W, $U^{(z)}$, $U^{(r)}$ and U are weight matrixes by training, $b^{(z)}$, $b^{(r)}$ and $b^{(h)}$ are offsets by training, $\sigma$ is a sigmoid activation function, and the symbol ○ is an element-wise product. The computation of equations (1)-(4) are abbreviated as $$w_t = GRU(v_t, w_t) \quad \text{Equation (5)}$$

A Long Short-Term Memory (LSTM) is a type of RNN architecture that allows the context memory to be stored and available for a longer time than in a traditional RNN. A LSTM may be described by the following equations. In equations 6-12, $x_t$ is the input to the LSTM memory cell layer at time t, $W^{(i)}$, $W^{(f)}$, $W^{(o)}$, $W^{(c)}$, $U^{(i)}$, $U^{(f)}$, $U^{(o)}$ and $U^{(c)}$ are all weight matrices.

$$i_t = \sigma(W^{(i)} x_t + U^{(i)} h_{t-1}) \quad \text{Equation (6)}$$

$$f_t = \sigma(W^{(f)} x_t + U^{(f)} h_{t-1}) \quad \text{Equation (7)}$$

$$o_t = \sigma(W^{(o)} x_t + U^{(o)} h_{t-1}) \quad \text{Equation (8)}$$

$$\tilde{c}_t = \tan h(W^{(c)} x_t + U^{(c)} h_{t-1}) \quad \text{Equation (9)}$$

$$c_t = f_t \circ c_{t-1} + i_t \circ \tilde{c}_t \quad \text{Equation (10)}$$

$$h_t = o_t \circ \tan h(h_t) \quad \text{Equation (11)}$$

wherein t is a time step, $x_t$ is an input at the time step t, $W^{(i)}$, $W^{(f)}$, $W^{(o)}$, $W^{(c)}$, $U^{(i)}$, $U^{(f)}$, $U^{(o)}$, and $U^{(c)}$ are weight matrixes by training, σ is a sigmoid activation function, and ○ is an element-wise product. The computation of equations (6)-(11) are abbreviated as $$h_t = LSTM(x_t, h_t) \quad \text{Equation (12)}$$

Figure 6:
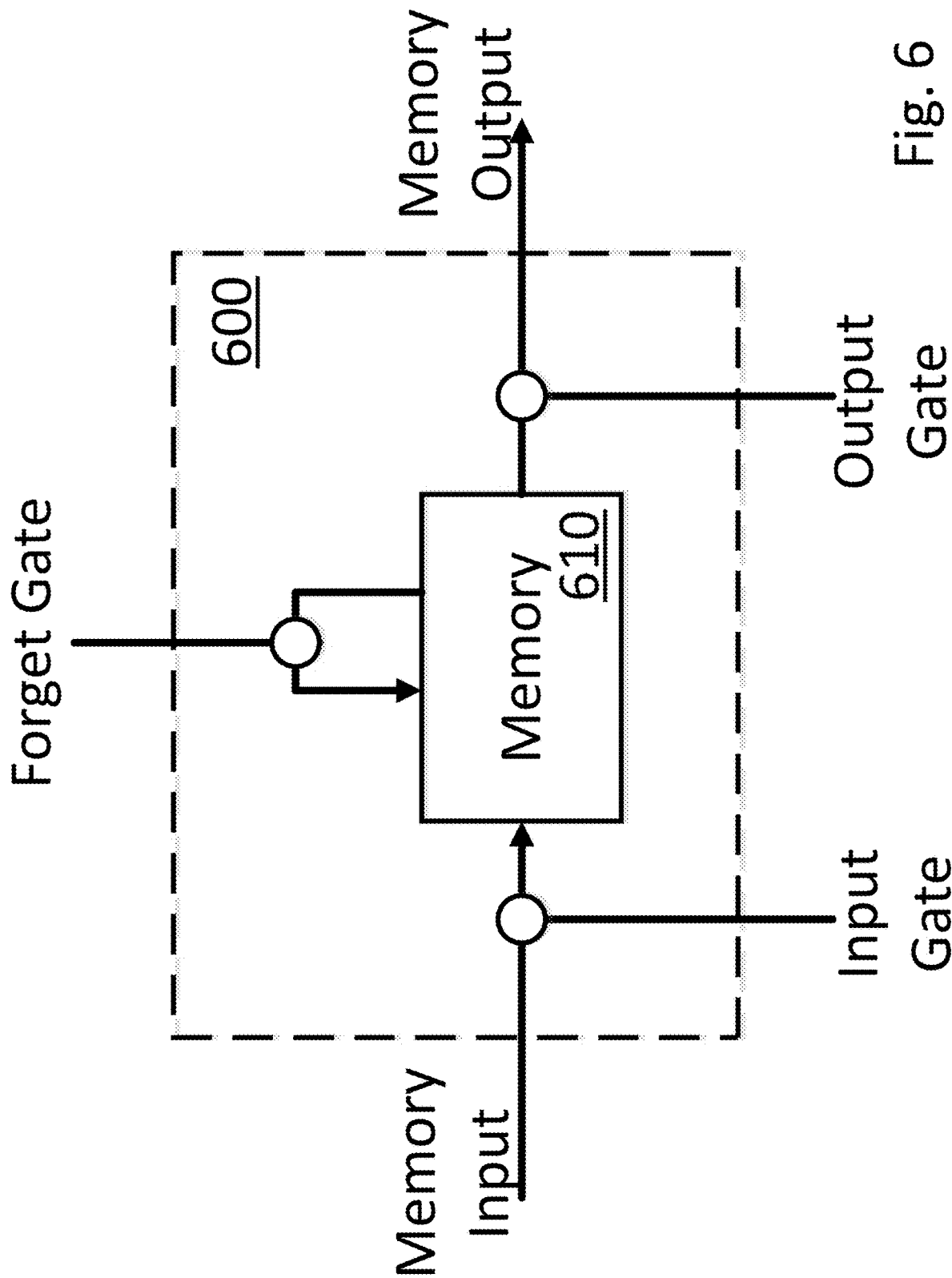
FIG. 6 is a schematic of a long-term short term memory system in accordance with one embodiment of the present invention.

FIG. 6 is a schematic of a LSTM in accordance with the equation 12. LSTM memory cell 600 has a memory input and a memory output. An input gate blocks or allows the contents of the memory input to affect the memory 610 of memory cell 600. The input gate of a LSTM is defined by $i_t$ in Equation 6 and the memory input by $\tilde{c}_t$ in Equation 9. An output gate blocks or allows the contents of memory 610 to be applied to the memory output of memory cell 600. The output gate of a LSTM is defined by $o_t$ in Equation 8 and the memory output by $h_t$ in Equation 11. The forget gate of memory cell 600 is defined by $f_t$ in Equation 7, and determines whether the past value of memory 610 will be remembered despite the memory input, or if memory 610 will be overwritten by the memory input. The state of memory cell 610 is defined by $c_t$ in Equation 10.

Various methods exist for learning or computing vector space representations of words. For example, the Glove Vectors for Word Representation (GloVe) model is a global log-bilinear regression tool that combines the global matrix factorization and local context window methods. Similarly, the Word2Vec tool from GOOGLE INC.™ provides an implementation of the continuous bag-of-words and skip-gram methods. These tools take text as input and produce word vectors as output. Training text data is used to construct a vocabulary and vector representations of words are made. These word vectors, when trained to predict the context of a word, may represent in vector space much of the information available in a dictionary, as well as additional contextual data. The resulting word vector can be used as a feature in machine learning applications such as NLP. As is obvious to one skilled in the art, other tools using other models or combinations of models, such as a Feedforward Neural Network Language Model and Recurrent Neural Network Language Model may be used.

FIG. 2A is an exemplary stream of information, questions, and answers. Information statements 210, 211 and 212, which are preceded by an "I:" in this example, are applied to a DMN. Note the sparse nature of the information provided. In one embodiment, word vectors in the input sequence are trained with a GloVe or a Word2Vec model. Other training methodologies may be used. Questions 220, 221, 222, 223, 224, 225 and 226, which are preceded by a "Q:" in this example, are applied to the DMN in sequence. These questions 220-226 query the DMN on attributes of the information statements 210-212. Note that elements of the questions contain words or concepts that are not present in information statements 210-212. For example, question 223 "Who are the people?" includes the word "people" which is not present in information statements 210-212.

Trained on the information statements and context from prior information, such as raw text and question answer pairs, the DMN can recognize that that Jane and John are people. Depending on the training method, this recognition may be based on one or more features in the feature vector for "people". For example, this recognition may be based on one or more of the identification of Jane as a woman in information statement 210, the identification of John as a man in information statement 210, that Jane and John are a couple in information statement 211, that they are capable of having a baby in information statement 212, and extraneous information outside of information statements 210-212, such as the identification of "Jane" and "John" as common names for people.

Answers 230, 231, 232, 233, 234, 235 and 236, which are preceded by an "A:", are output from the DMN. Note that various different types of questions may be answered by the DMN. For example, answer 235 to question 225 tags the computer parts of speech (POS) of the sentence "Jane has a baby in Dresden". Similarly, the question and answer format works for named entity recognition, for example, answer 233 recognizes the named entities "Jane" and "John" in response to question 223 "who are the people" and identifying Jane as a person and Dresden as a location in answer 234 in response to question 224.

In an alternative application of the technology disclosed, sentiment analysis may also be performed using a DMN question and answer format, for example identifying in answer 231 that the sentiment sought by question 221 is positive. Co-reference resolution is also handled in the question and answer format of the DMN by resolving question 220 reference to "their" as answer 230 "Jane and John". Even machine translation may be handled in the form of a question and answer with the DMN, as in question 226 asking to translate a statement to French, which is provided in answer 236.

Referring to FIG. 5, information statements 510, 511, 512 and 513 give facts about coloring of fowl and the swan John. When question 520 is asked, merely reviewing information statements 510-513 in a semantic memory without context will not produce the answer needed, as the statements do not expressly answer the question. Transitive reasoning over the input facts is needed to answer question 520, an episodic memory is able to return to information when additional context becomes known. Therefore, initially when DMN starts reviewing information statements from 510 to 513, to answer Question 520, information statement 510 appears irrelevant to the question. However, when DMN 100 learns that John is a swan from information statement 512, an episodic memory can go back through the input facts it has stored to find out information about swans to further answer questions about John. From this combination of facts obtained through reassessing information in episodic memory 120, DMN 100 can answer that John is grey in answer 530.

Figure 3:
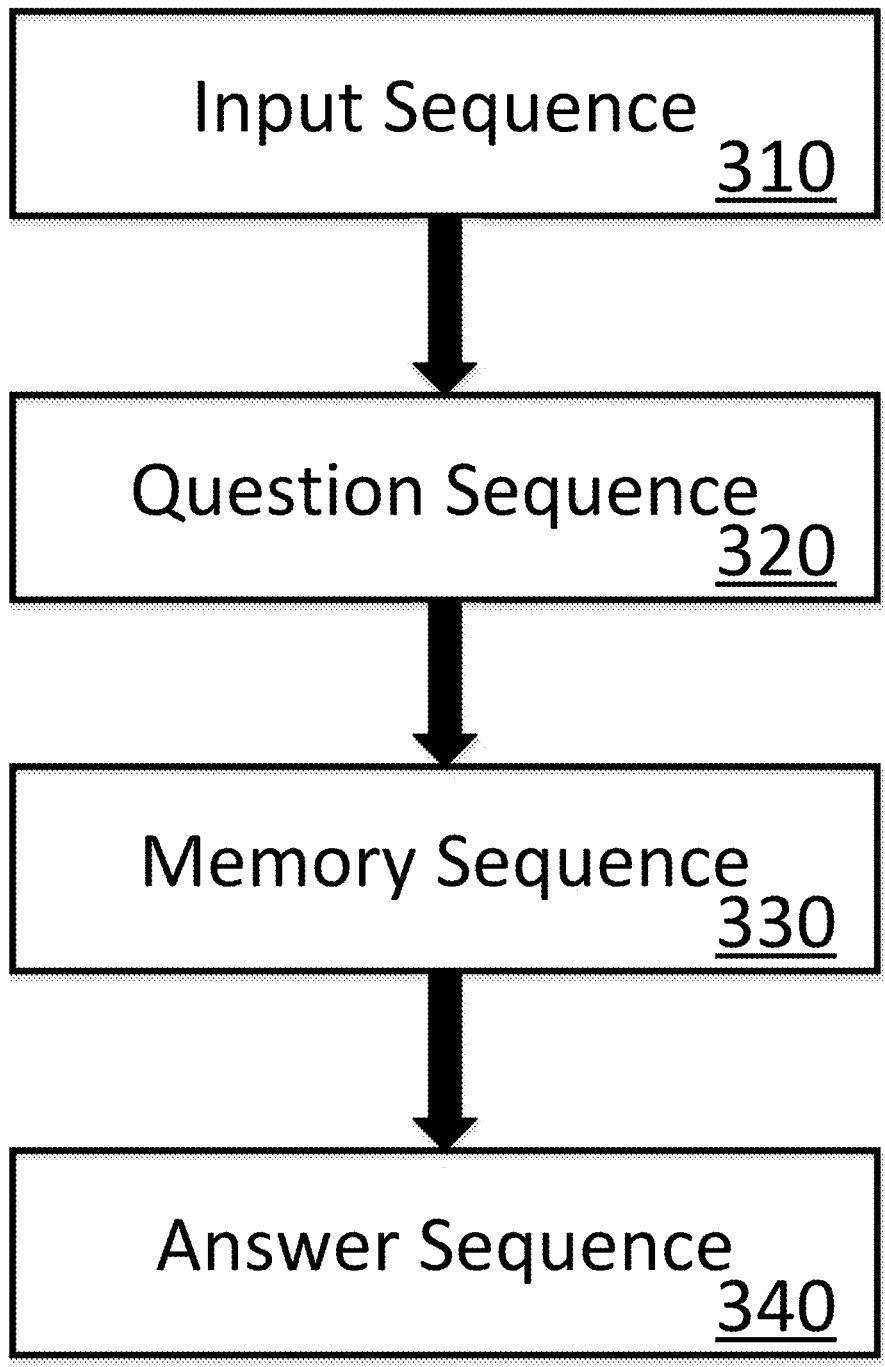
FIG. 3 is a flowchart of a DMN operation 300 in accordance with one embodiment the present invention.

FIG. 3 is a flowchart of a DMN operation 300 in accordance with one embodiment the present invention. The DMN operation 300 begins with an input sequence operation 310 where the DMN creates or updates word vectors on input sequences. In one embodiment, GloVe is used to train word vectors. In another embodiment, Word2Vec is used to train word vectors. Other training programs or methods may be used. In one embodiment, input sequences for textual input may include publicly available content such as Wikipedia. Other datasets or combinations of datasets may be used as input sequences, including training datasets.

Input sequence operation 310 trains on initial input sequences to obtain hidden states for words and sentences. In one embodiment, the initial sequence model LSTM language model is used. In one embodiment, the LSTM language model is bidirectional. Other embodiments may use other models or combinations of models, such as a GRU model. If the words in the input sequence are $x_s, \ldots, X_{T_v}$, the DMN is trained to obtain hidden states for words $w_s, \ldots, W_{T_w}$ and sentences $s_1, \ldots, S_T$. A sentence vector is defined to be the hidden state over that sentence's last word, such that $s_t = w_{w_i(t)}$, where $w_i(t)$ is the word index of the last word of the $t^{th}$ sentence. In other words, in one embodiment, $$s_t = \text{LSTM}(w_{w_i(t)}, s_{t-1}) \quad \text{Equation (13)}$$

Word vectors may be provided to a RNN sequence model to compute context-dependent representations at each time step, for example $w_t = \text{MODEL}(v_t, w_{t-1})$, resulting in a full sequence W. In one implementation, other modules can access both original word vectors as well as the hidden states $w_t$. A GRU can be used or an LSTM. In another implementation, a standard single layer tan h RNN is used. In one implementation, the DMN adapts the sequence model to provide gates that allow the model to suffer less from the vanishing gradient problem.

Depending on the module of the DMN, the usage notation of equation 5 changes, but the internal states and functions are the same. Collectively, equations 5, 12 and other existing neural network architectures are abbreviated as $h_t = \text{MODEL}(x_t, h_t)$, where MODEL is the type of architecture used. In some embodiments, there is a direct output in terms of a word, for example, a standard supervised class label, which is computed via $y_t = \text{softmax}(W^{(s)} h_t)$.

Different subsequences, such as sentences, may be retrieved depending on the task. For some datasets, the sentence separation is useful. In those situations, each sentence's last hidden vector is available in order to obtain a sequence S of sentence vectors $S = s_1, \ldots, s_{T_s}$.

Question sequence operation 320 maps an input into a representation that can then be used for querying specific facts from the input module. If each question consists of a sequence $T_q$ word vectors $v_t$, then a hidden state may be computed for each of those question vectors. For example, in one embodiment, a hidden state may be computed for each question vector via $q_t = \text{GRU}(v_t, q_{t-1})$, where the GRU weights are shared with the input module. The final question vector would then be defined as $q = qT_q$. In another embodiment, another sequence model, such as LSTM, may be used. In one embodiment, the sequence model is bidirectional.

Memory sequence operation 330 uses the operational input sequence in response to the final question vector q. In one embodiment, the memory sequence operation will go through the operational input sequence multiple times. In one embodiment, the memory sequence operation will go through sentences, taking as input an entire sentence vector. In another embodiment, the memory sequence operation will go through words, taking as input each word vector.

Episodic memory within memory sequence operation 330 combines input received from semantic memory, input facts and questions, reasons over those inputs, and provides the resulting knowledge as answers. Given the question vector q, episodic memory dynamically retrieves needed information over the sequence of words W or sentences S. In many cases, reasoning over the first input facts identifies additional facts that are needed. Therefore, episodic memory may iterate over inputs multiple times in multiple passes. Each iteration is defined as an episode. In other words, some questions require the episodic memory within memory sequence 330 to do transitive inference.

In one embodiment, episodic memory is a deep function that returns a memory representation from inputs of the form m=EM(W,S,q) that is relevant for the question vector q. In one embodiment, one or more of a memory sequence over sentences or words is triggered based on a simple linear classifier on the question vector. For a memory sequence over words, the representation of the output is simply a sequence $M = m_1, \ldots, m_{T_w}$. In one embodiment, each $m_t$ is computed via a simple neural network $m_t = f(W^{(m)} w_t)$. In another embodiment, each $m_t$ is computed via a GRU. For a simple linear classifier, the answer module in answer sequence 340 outputs a label for each element of the sequence. Example tasks utilizing this process are part of speech tagging, named entity recognition, and other sequence labelling tasks.

Figure 8:
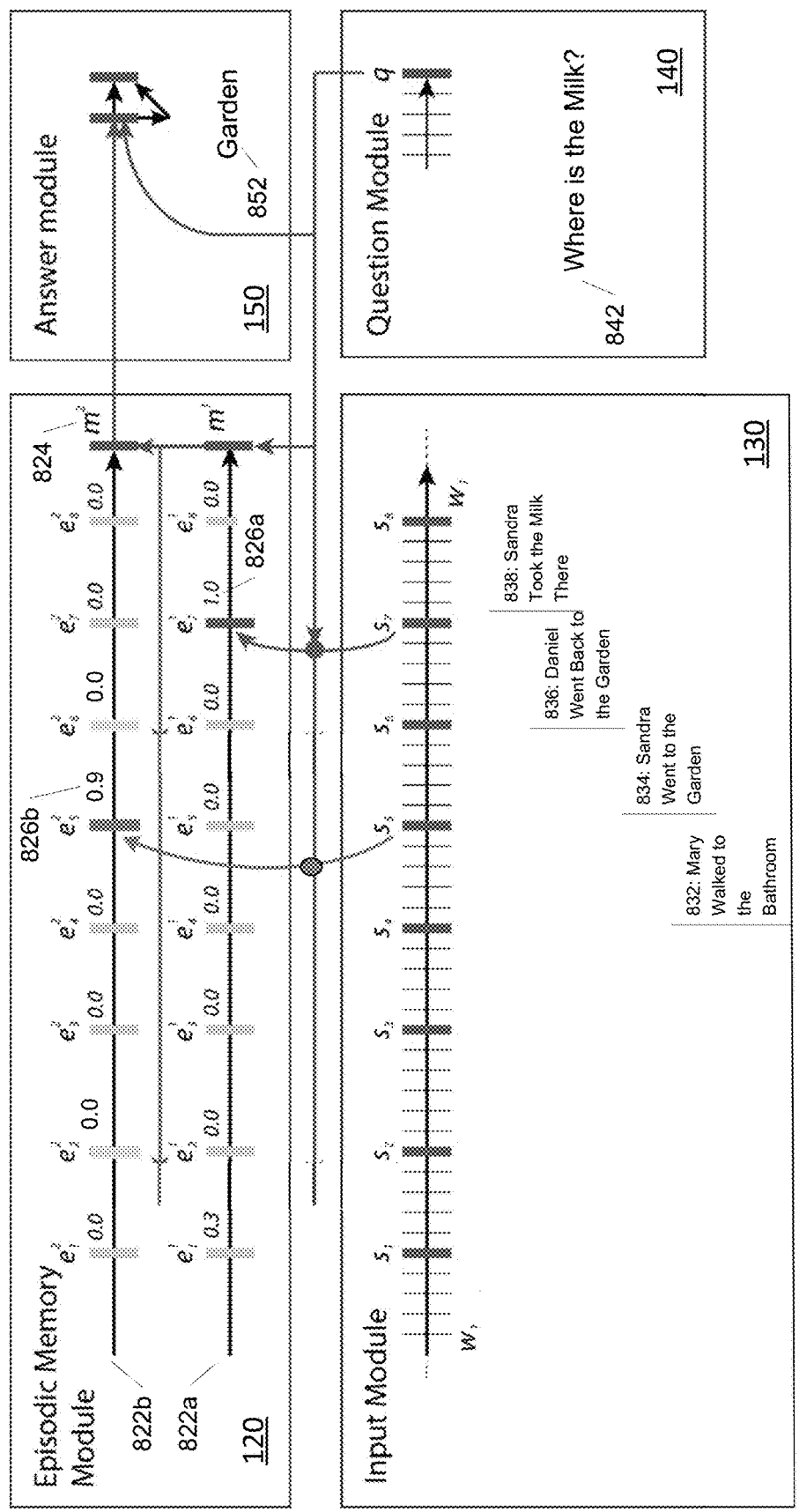
FIG. 8 is a block diagram illustrating an exemplary gating mechanism for use with an episodic memory in accordance with the present invention.

The DMN disclosed is also able to reason over more complex semantic questions, such as those involving multiple facts written in a series of natural language sentences. In a complex question, an expected output is a memory vector m. In one embodiment, the memory vector m corresponds to the last of a sequence of increasingly complete memory vectors as episodic memory traverses episodes in passes. In one embodiment, at the beginning of the information retrieval process within memory sequence 330, the episodic memory episode 1 is initialized to the question vector $m^0 = q$. Next, a series of attention gate values are computed, one for each sentence in the input. An attention gate value represents how relevant that sentence is for the question and after a first pass, the most recent attention gate values. A gate may also represent an accounting of what else is currently stored within episodic memory. An example of episodic memory in accordance with one embodiment of the present invention is described below with reference to FIG. 8 and input 200B of FIG. 2B.

In the first set of inputs 200B of FIG. 2B, we may ask, "Where is Mary?" and would expect that the gate for the first sentence 242 is close to 1, since it includes "Mary" whereas all other gates of sentences 242-246 that do not mention Mary would be close to 0.

The gating function G takes as input a sentence vector at time step t, the current memory vector and the question vector: $g^1_t = G(s_t, m^0, q)$ and returns a single scalar g. We define the function $g^1_t = G(s_t, m^0, q)$ as follows:

$$z(s,m,q) = [s \circ q, s \circ m, |s-q|, |s-m|, s, m, q, s^T W^{(b)} q, s^T W^{(b)} m] \quad \text{Equation (14)}$$

$$G(s,m,q) = \sigma(W^{(2)} \tan h(W^{(1)} z(s,m,q) + b^{(1)}) + b^{(2)}) \quad \text{Equation (15)}$$

wherein t is a time step, s is a sentence or word, m is a memory for a calculated coefficient of relevance for a sentence or word, t is a time step, q is the question, T is an upper bound of the input facts, $W^{(b)}$, $W^{(1)}$, $W^{(2)}$ are weight matrixes by training, $b^{(1)}, b^{(2)}$ are offsets by training, σ is a sigmoid activation function and is an element-wise product.

Now, we define the first episode vector as a gate-weighted sum of all the sentence vectors:

$$e^1 = \sum_{t=1}^{T} softmax(g_t^1) s_t,$$ Equation (16)

Where softmax $$(g_t^1) = \frac{\exp(g_t^1)}{\sum_{j=1}^{T} \exp(g_j^1)}$$

This episode vector 822a, 822b stores the information that the model determines relevant at the current episode. Doing this once would be enough if there was only one relevant fact necessary to answer the question. However, consider the first question 250 (where is the milk?) in FIG. 2B again. In order to answer where the milk is, the model first has to retrieve the sentence 838 that mentions that Sandra took the milk. Now the model knows that Sandra's whereabouts are relevant. However, that fact (Sandra went to the garden) 834 was mentioned before the model knew it was relevant. Hence, the first fact 838 will be incorporated into episodic memory 120, and then iterate another episode over the inputs to retrieve the second fact 244 (that Sandra is in the garden) of fact set 200B in FIG. 2B. Another GRU over episode vectors 822a, 822b as defined in Equation 16 (above) to compute memories: $m^1 = GRU(e^1; m^0)$ 824.

Examples of questions that only need one relevant fact to answer are simple questions, part of speech tagging, counting, and some image processing.

An episodic memory process may iterate until a classifier on each memory vector predicts that all necessary information is collected and ends. Otherwise, the gates 826a, 826b would be computed again, this time incorporating the last memory: $g_t^2 = G(s_t, m^1, q)$, followed by the computation of the episode vector which is given to the final memory GRU. The ability to take multiple passes over the same input but with knowledge from previous passes allows the DMN to do such multi-step reasoning. In the case of the some datasets that mark which facts are important for a given question (e.g. the Facebook babI dataset) the input gates of Equation 15 can be trained supervised with a standard cross entropy classification error function. The final output of the episodic memory is the final episode memory vector $m = m^E$.

In one embodiment, memory sequence operation 330 builds memories over sentences $s_1, \ldots, s_T$. A novel modified LSTM is presented with the following operation:

$i_t = g_i(m_{t-1}, s_t, q) \in \mathbb{R}$ Equation (17)

$f_t = g_f(m_{t-1}, s_t, q) \in \mathbb{R}$ Equation (18)

$o_t = \sigma(W^o s_t + U^o m_{t-1} + V^o q)$ Equation (19)

$\tilde{c}_t = \tan h(W^c s_t + U^c m_{t-1} + V^c q)$ Equation (20)

$c_t = f_t \cdot c_{t-1} + i_t \cdot \tilde{c}_t$ Equation (21)

$m_t = o_t \circ \tan h(c_t)$ Equation (22)

In the modified LSTM of equations 17-22, $i_t$ is the input gate, $f_t$ is the forget gate, $o_t$ is the output gate, $\tilde{c}_t$ is the candidate value for the memory cell, $c_t$ is the new state of the memory cell and $m_t$ is the output gate, all at time t.

Figure 7:
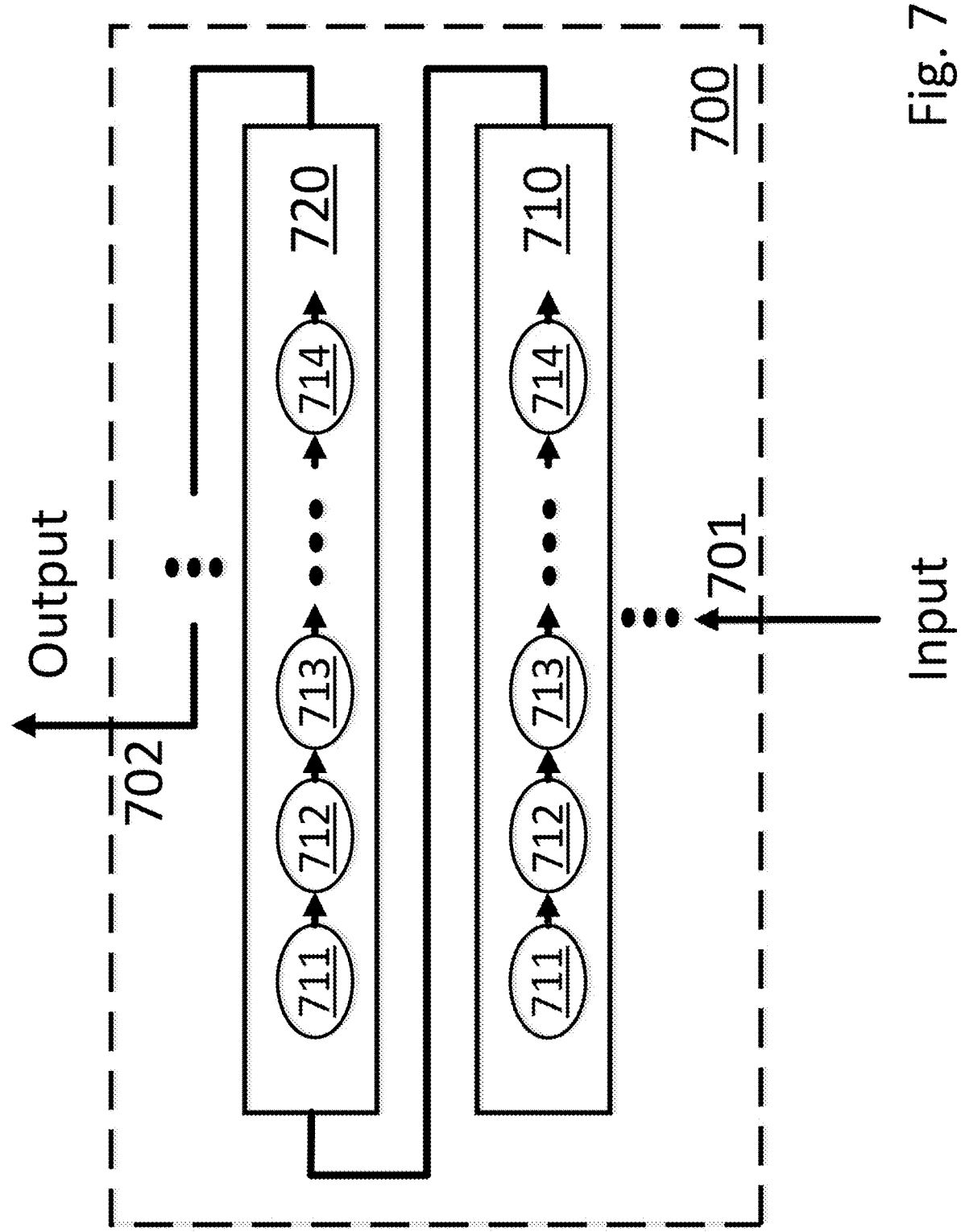
FIG. 7 is a functional block diagram of an episodic memory in accordance with the present invention.

FIG. 7 is a functional block diagram of one episodic memory implementation. Episodic memory 700 comprises a memory input 701, a memory output 702 and one or more fact memories 711, 712, 713 and 714 traversed in one or more episodes, or "passes" such as episodes 710 and 720. Episode 2 720 comprises a "second pass" traversal of the one or more fact memories 711, 712, 713 and 714 traversed during a "first pass" in episode 1 710. In one embodiment, fact memories 711 of Episode 1 710 and 711 of Episode 2 720 store the same facts, however, values for calculated coefficients of relevance (not shown by FIG. 7 for clarity sake) can be updated based upon the results of a first traversal of fact memories 711-714 during episode 1 710 prior to subsequent traversal of the fact memories 711-714 during episode 2 720.

In one embodiment, stream of information 500 is applied to episodic memory through memory input 701. In response to information statements 510-513, fact memory 711 stores a representation of fact 510 "swans are grey"; fact memory 712 stores a representation of fact 511 "hummingbirds are green or blue"; fact memory 713 stores a representation of fact 512 "John is a swan"; and fact memory 714 stores a representation of fact 513 "John lives in California in the summer". In one embodiment, episodic memory 700 attempts to answer question 520 "what color is John?" by traversing episodes including episodes 710 and 720 in order to find an answer. Within episode 1 710, fact memory 711 is not relevant to the answer, because while grey is a color, it is in reference to swans, not John. Similarly, fact memory 712 is not relevant to the answer, because while green and blue are colors, it is in reference to hummingbirds, not John. However, fact memory 713 is relevant to John, as it provides additional information that John is a swan. Therefore, fact memory 713 is enabled for answering question 520. In one embodiment, fact memory 713 is enabled as relevant to the answer through a fact highlighting system. In another embodiment, fact memory 713 is enabled via a fact gate. In another embodiment, fact memory 713 is enabled through an answer relevance system. In one embodiment, the internal representation of question 520 (not shown in FIG. 7 for clarity sake) is updated with the additional information about John. The traversal of fact memories in episode 1 710 concludes by identifying another fact memory, fact memory 714 as relevant to John, as fact memory 714 provides information that John lives in California in the summer. Therefore, at the conclusion of episode 1, fact memory 713 and fact memory 714 are enabled for answering question 520. In one embodiment, the state of fact memories within episode 1 710 is conveyed to episode 2 720.

As the DMN has not yet determine an answer to question 520, the DMN processing continues to make additional passes traversing the fact memories of episodic memory 700, including episode 2 720. When traversing fact memories 711-714 during episode 2 720, fact memory 711 is now determined to be relevant to the answer, because grey is a color of swans and now we know that, because John is a swan, information about swans may be relevant to the answer. Therefore, fact memory 711 now is enabled for answering question 520. Fact memories 712-714 are similarly traversed.

An input gate blocks or allows the contents of the memory input to affect the memory 710 of memory cell 700. The input gate of a LSTM is defined by $i_t$ in Equation 17 and the memory input by $\tilde{c}_t$ in Equation 20. An output gate blocks or allows the contents of memory 710 to be applied to the memory output of memory cell 700. The output gate of a LSTM is defined by $o_t$ in Equation 19 and the memory output by $m_t$ in Equation 22. The forget gate of memory cell 700 is defined by $f_t$ in Equation 18, and determines whether the past value of memory 710 will be remembered despite the memory input, or if memory 710 will be overwritten by the memory input. The state of memory cell 710 is defined by $c_t$ in Equation 21.

In one embodiment, input gate values are computed with a deep neural network. In one embodiment, the first tensor layer of the deep neural network is an NTN-based function similar to that described in the published paper "Reasoning With Neural Tensor Networks for Knowledge Base Completion" In *Advances in Neural Information Processing Systems*, pp. 926-934, 2013, which is incorporated in full herein by reference, and represented by equation 23:

$$g_t(m_{t-1}, s_t, q) = \sigma\left(W \tanh\left(V \tanh\left(U \begin{bmatrix} m_{t-1} \\ s_t \\ q \end{bmatrix}\right)\right)\right) \quad \text{Equation (23)}$$

In one embodiment, the last layer is a single row vector in the sentence case.

If the input gate is 0, then that input sequence is not an important memory for the present question. If the forget gate is 1, then the past episodic memories aren't important anymore. However, in the above equation the input gate and forget gate have a value between zero and one. In the LSTM, in one embodiment, the input gate and forget gate are linear layers. However, as these gates may be very complex or be very important to the outcome, more influence may be required to drive their output. In one embodiment, a hard, shifted sigmoid is used to turn an input's importance to full 0 or full 1 by replacing σ in equation 23 with min(max(0, x),1).

In one embodiment, multiple passes are made over the input sequences, updating the episodic memories continuously.

Figure 9:
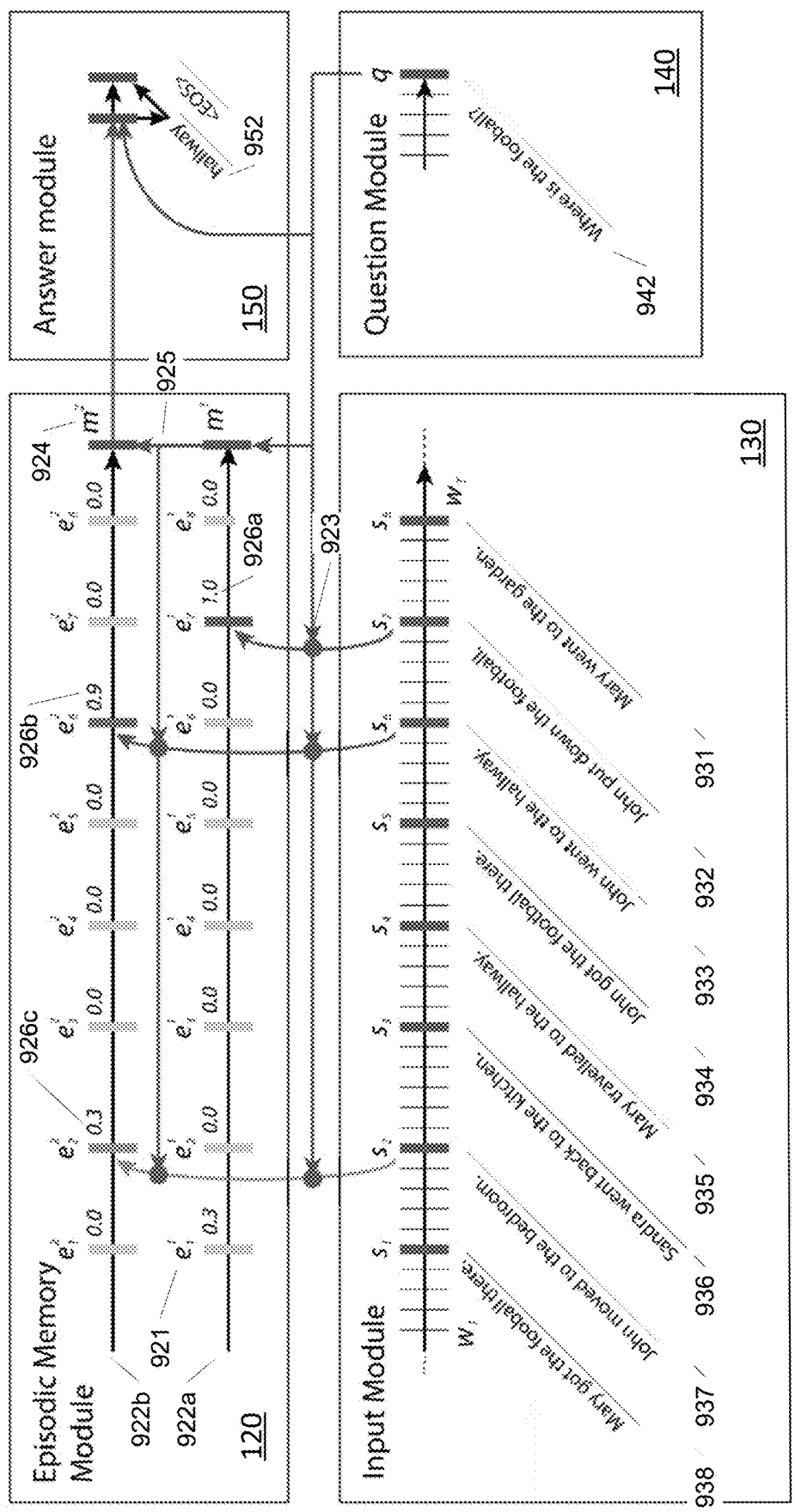
FIG. 9 is a block diagram illustrating an exemplary attention focusing mechanism for use with an episodic memory in accordance with the present invention.

FIG. 9 is a block diagram illustrating an exemplary attention focusing mechanism for use with an episodic memory in accordance with the present invention. As shown in FIG. 9, episodic memory module 120 iterates over representations of questions 942 and input facts 931-938 provided by question module 140 and input module 130, respectively, while updating its internal episodic memory. Question module 140 in conjunction with input module 130 provide episodic memory module 120 with vector representations of questions 942 to answer based upon input facts 931-938. The episodic memory module 120 retrieves facts from the input module 130 conditioned on the question. Episodic memory module 120 then reasons over those facts to produce a final representation that the answer module 150 will use to generate an answer 952. This representation is referred to herein as a memory. In one embodiment, the final outcome of the episodic memory is given to the answer module that is comprised of an RNN that can generate any sequence of output labels based upon the final outcome of the episodic memory and provide the sequence of output labels as the answer.

The episodic memory module 120 takes multiple passes over the facts, iterating over representations output by the input module 130, while considering question input 942 and previous memory $m^{i-1}$ to produce an episode 921 $e^i$, updating internal episodic memory 924 $m^i$=GRU($e^i$, $m^{i-1}$), enabling the system to focus attention on different facts at each pass. Initial state of the GRU is the question vector, $m^0$=q. Each pass produces an episode 921, i.e., $e_1$-$e_8$, and these episodes are then summarized into the memory 922a, 922b. Episodic processing enables embodiments to direct an attention mechanism 923 and recurrent network 925 to attend more selectively to specific facts and update internal memory on each pass (i.e., memory 922a, 922b), further enabling the embodiment to attend to other important facts at a later pass. After $T_M$ passes, the final memory $m^{T_M}$ is given to the answer module 150. Yet further, embodiments are enabled for a type of transitive inference, since the first pass may uncover the need to retrieve additional facts. Answer 952 is provided by the answer module 150 based upon the episodic memory output 924.

Again with reference to the example in FIG. 9, question module 140 provides input of a question 942, "where is the football?" In the first iteration, the model ought attend to sentence 932 (John put down the football.), as the question 942 asks about the football. Once the model discovers from sentence 932 that John is relevant to the football, and has updated episode $e_7^1$ 926a of memory 922a with a value of 1.0, it can reason that the second iteration (e.g., memory 922b) should retrieve where John was. During the second iteration, the system locates sentence 933 (John went to the hallway) and updates episode $e_6^2$ 926b of memory 922b with a weight value of 0.9 indicating that the hallway is relevant location to John, and hence the football. (Note that in the second iteration, the DMN has wrongly placed some weight (0.3) in episode $e_2^2$ 926c of memory 922b for sentence 937, which makes some intuitive sense, as sentence 937—"John moved to the bedroom"—is another place John had been).

In an embodiment, a gating function as the attention mechanism. The gating function takes as input, for each pass i, a candidate fact $c_t$, a previous state $m^{i-1}$, and the question q to compute a gate 923: $g_t^i$=G($c_t$, $m^{i-1}$, q).

The state is updated by way of a GRU: $m^i$=GRU($e^i$, $m^{i-1}$), where $e^i$ is the computed episode at pass i. The state of the GRU can be initialized randomly or to the question vector, $m^0$=q. The function G takes as input the feature set z(c, m, q) and returns a single scalar and is defined as:

$$z(c,m,q)=[c,m,q,c \circ q, c \circ m, |c-q|, |c-m|, c^T W^{(b)} q, c^T W^{(b)} m] \quad \text{Equation (24)}$$

$$G(c,m,q)=\sigma(W^{(2)} \tan h(W^{(1)} z(c,m,q)+b^{(1)})+b^{(2)}) \quad \text{Equation (25)}$$

wherein t is a time step, c is a sentence or word, m is a memory for a calculated coefficient of relevance for a sentence or word, t is a time step, q is the question, T is an upper bound of the input facts, $W^{(b)}$, $W^{(1)}$, $W^{(2)}$ are weight matrixes by training, $b^{(1)}$, $b^{(2)}$ are offsets by training, G is a sigmoid activation function and is an element-wise product.

To compute the episode for pass i, we employ a modified GRU over the sequence of $T_C$ fact inputs $c_1, \ldots, c_{TC}$ weighted by the gates $g^i$. The episode vector that is given to the answer module is the final state of the GRU. The equation (26) to update the hidden states of the GRU at time t and the equation (27) to compute the episode are, respectively:

$$h_t^i = g_t^i GRU(c_t, h_{t-1}^i) + (1-g_t^i) h_{t-1}^i \quad \text{Equation (26)}$$

$$e^i = h_{T_c}^i \quad \text{Equation (27)}$$

In one embodiment, the episodic memory module also has a signal to stop iterating over inputs. To achieve this, a special end-of-passes representation is appended to the input, and stop the iterative attention process if this representation is chosen by the gate function. For datasets without explicit supervision, a maximum number of iterations can be set.

Figure 10:
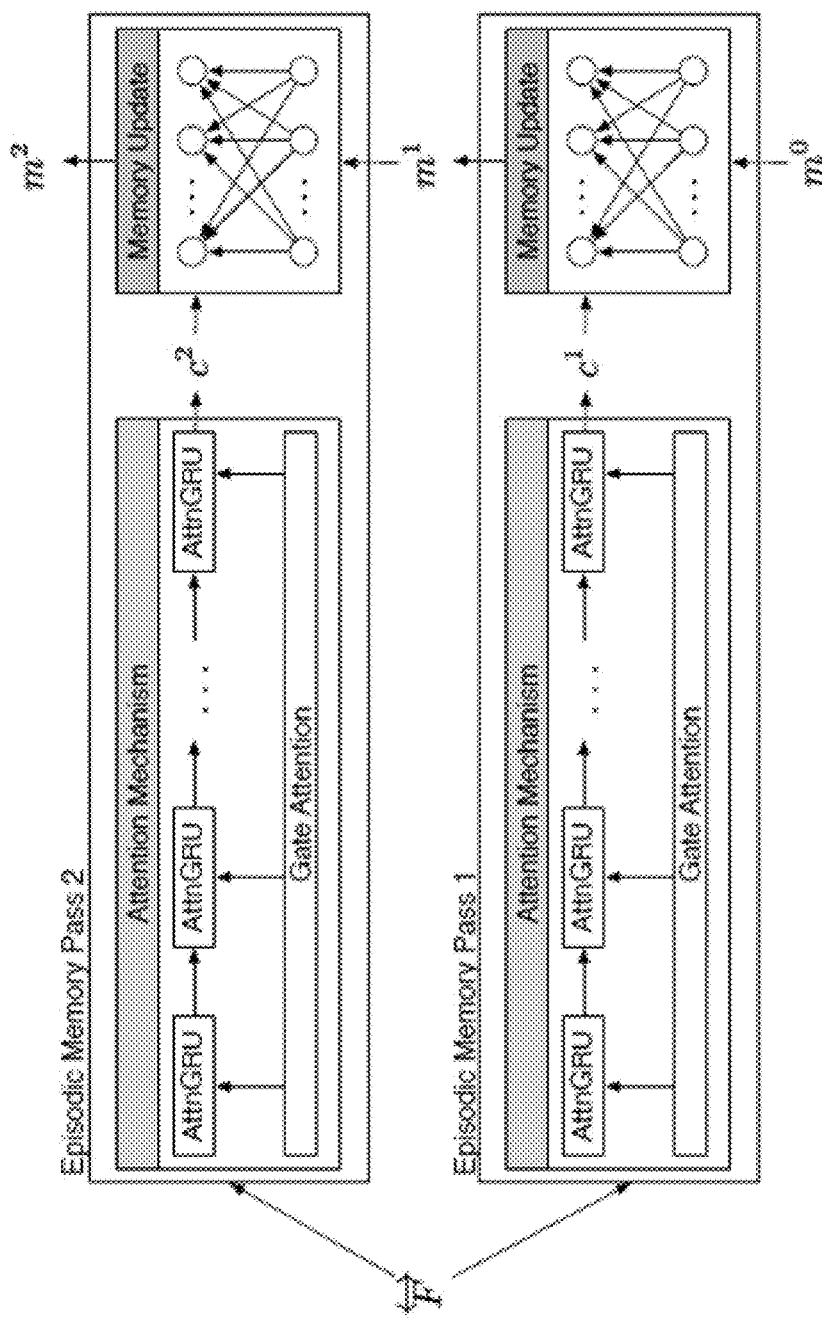
FIG. 10 is a block diagram illustrating an exemplary episodic memory using an attention focusing mechanism in accordance with the present invention.

FIG. 10 is a block diagram illustrating an exemplary episodic memory using an attention focusing mechanism in accordance with the present invention. The episodic memory module 1000, as depicted in FIG. 10, retrieves information from the input facts $\vec{F} = \vec{f}_1, \ldots, \vec{f}_N$ ] provided to it by focusing attention on a subset of these facts. The attention focusing can include associating a single scalar value, the attention gate $g_i^t$, with each fact $\vec{f}_i$ during pass t. This is computed by allowing interactions between the fact and both the question representation and the episode memory state:

$$z_i^t = [\vec{f}_i \circ q; \vec{f}_i \circ m^{t-1}; |\vec{f}_i - q|; |\vec{f}_i - m^{t-1}|] \quad \text{Equation (28)}$$

$$Z_i^t = W^{(2)} \tanh(W^{(1)} z_i^t + b^{(1)}) + b^{(2)} \quad \text{Equation (29)}$$

$$g_i^t = \frac{\exp(Z_i^t)}{\sum_{k=1}^{M_i} \exp(Z_k^t)} \quad \text{Equation (30)}$$

wherein t is a time step, $\vec{F} = [\vec{f}_1 \ldots, \vec{f}_N]$, $m^{t-1}$ is the question memory at a previous time step, q is the question, $W^{(1)}$, $W^{(2)}$ are weight matrixes, $b^{(1)}$, $b^{(2)}$ are offsets, ∘ is an element-wise product, |·| is an element-wise absolute value, and; represents concatenation of vectors; and whereby a scalar value, attention gate $g_i^t$, is calculated using a softmax activation function and associated with each fact $\vec{f}_i$ during pass t.

Attention Mechanism

Having determined the attention gate $g_i^t$, an attention mechanism can be used to extract a contextual vector $c^t$ based upon the current focus. A soft attention and a novel attention based GRU will be next described to provide certain embodiments with improved performance.

Soft Attention:

A soft attention mechanism produces a contextual vector $c^t$ of coefficients of relevance through a weighted summation of sorted list of vectors $\vec{F}$ and corresponding attention gates $g_i^t$:

$$c^t = \sum_{i=1}^N g_i^t \vec{f}_i.$$

Embodiments employing such methods have advantages of being easy to compute and, if the softmax activation is "spiky" such mechanisms can approximate a hard attention function by selecting a single fact for the contextual vector whilst still being differentiable. In certain situations, soft attention mechanisms can experience loses both positional and ordering information during the summation process. However, multiple attention passes can retrieve some of this information.

Attention Based GRU.

Figure 11:
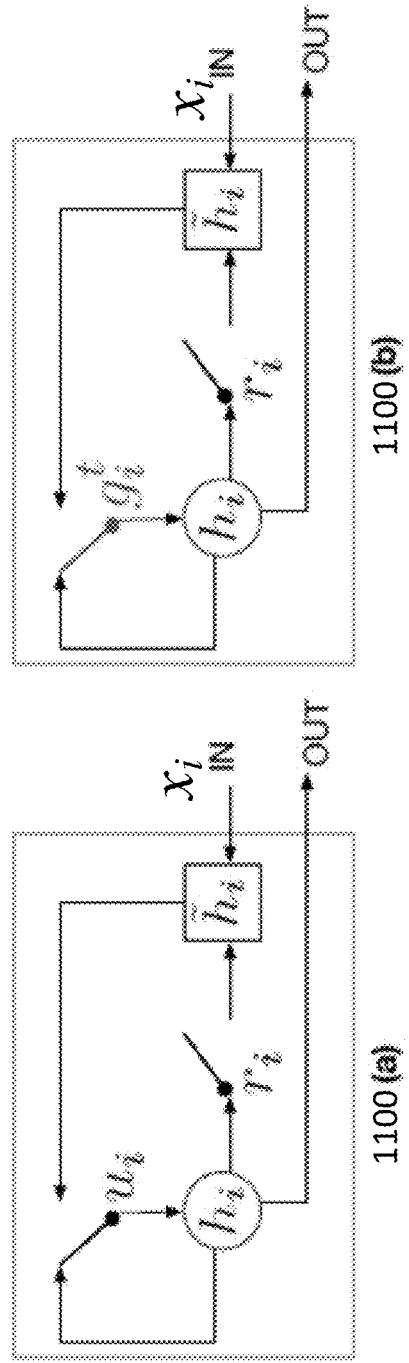
FIG. 11 is a block diagram illustrating an exemplary GRU using an attention focusing mechanism in accordance with the present invention.

For more complex queries, it is desirable for the attention mechanism to be sensitive to both the position and ordering of the input facts $\vec{F}$. An RNN would be advantageous in this situation, however, conventional RNN implementations cannot make use of the attention gate from Equation 30. Accordingly, a modified GRU architecture has been created by embedding information from the attention mechanism, as depicted with reference to FIG. 11, a block diagram illustrating an exemplary GRU using an attention focusing mechanism in accordance with the present invention. In FIG. 11, an update gate $u_i$ in block 1100(a) decides how much of each dimension of the hidden state to retain and how much should be updated with the transformed input $x_i$ from the current timestep. As $u_i$ is computed using only the current input and the hidden state from previous timesteps, it lacks any knowledge from the question or previous episode memory. By replacing the update gate $u_i$ in the GRU (block 1100(a)) with the output of the attention gate $g_i^t$ (block 1100(b)), the GRU can now use the attention gate for updating its internal state:

$$h_i = g_i^t \circ \tilde{h}_i + (1 - g_i^t) \circ h_{i-1} \quad \text{Equation (31)}$$

Note that $g_i^t$ is a scalar, generated using a softmax activation, as opposed to the vector $u_i$, generated using a sigmoid activation. Replacing the softmax activation in Equation 30 with a sigmoid activation would result in $g_i^t \in R^{n_H}$. To produce the contextual vector $c^t$ used for updating the episodic memory state $m^t$, the final hidden state of the attention based GRU can be used.

Episode Memory Updates

In one embodiment, after each pass through the attention mechanism, the episode memory state $m^{t-1}$ is updated with the newly constructed contextual vector $c^t$, producing memory state $m^t$. In the DMN, a GRU with the initial hidden state set to the question vector q is used for this purpose. The episodic memory for pass t is computed by:

$$m^t = GRU(c^t, m^{t-1}) \quad \text{Equation (32)}$$

Implementations that use different weights for each pass through the episodic memory can achieve certain advantages. In one embodiment, a rectified linear unit (ReLU) layer is used for the memory update, calculating the new episode memory state by:

$$m^t = ReLU(W^t[m^{t-1}; c^t; q] + b) \quad \text{Equation (33)}$$

where ";" is the concatenation operator, $W^t \in R^{n_H \times n_H}$, $b \in R^{n_H}$, and $n_H$ is the hidden size. Many types of ReLU functions exist that can provide viable alternative embodiments to Sigmoid or tan h functions. Just one of many example ReLU functions is: $f(x) = \max(0, x)$.

Input Fusion Layer

Figure 12:
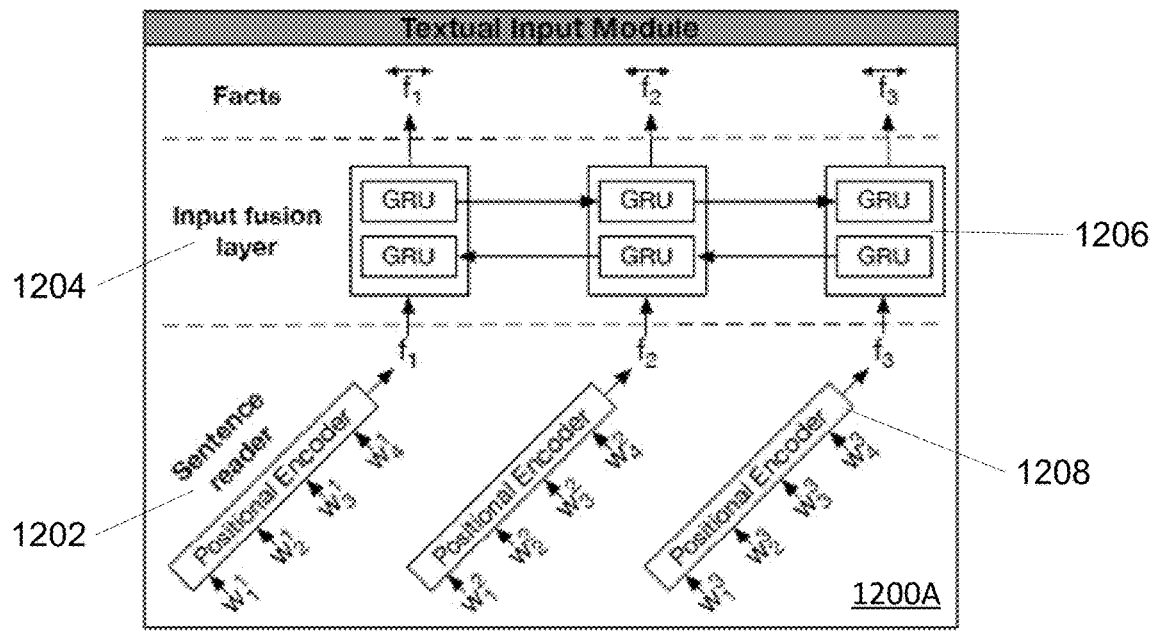
FIG. 12 is a block diagram illustrating an exemplary input fusion layer for use in a dynamic memory network in accordance with the present invention.
Figure 12:
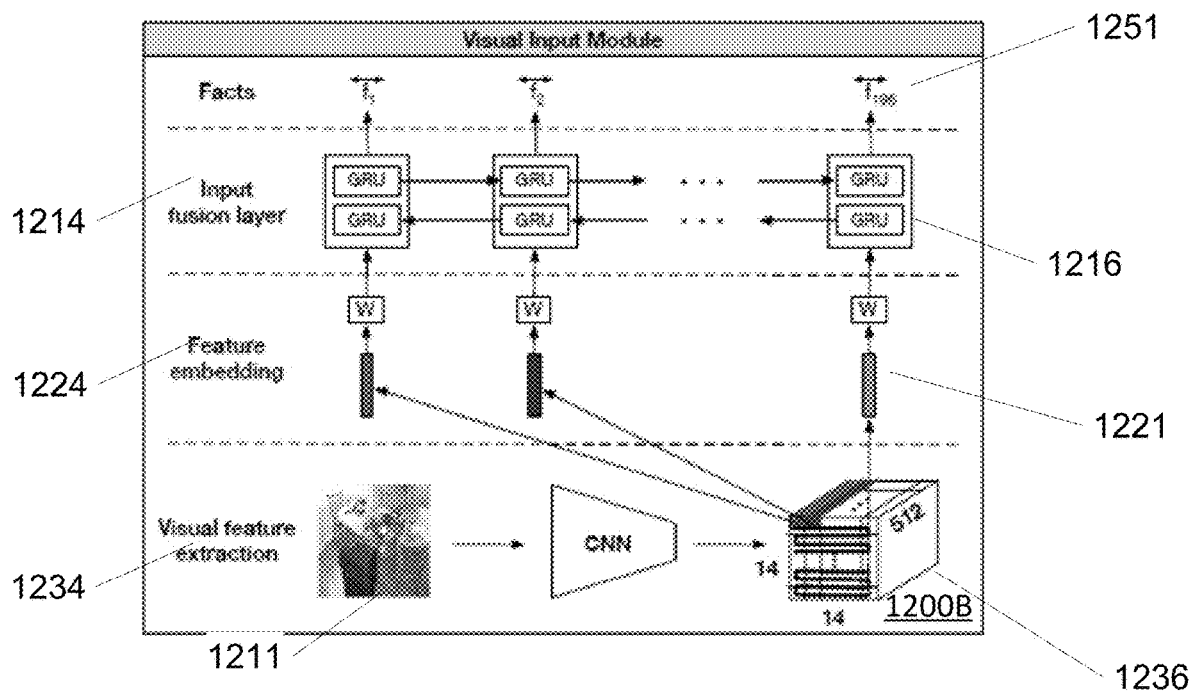

FIG. 12 is a block diagram illustrating an exemplary input fusion layer for use in a dynamic memory network in accordance with the present invention. As depicted by block 1200A, in one embodiment, the single GRU is replaced with novel combination of components. A sentence reader 1202 provides encoding the words into a sentence embedding. An input fusion layer 1204 facilitates interactions between sentences.

This hierarchical architecture allows content interaction between sentences. A novel bi-directional GRU 1206 for this input fusion layer 1204 enables information from both past and future sentences to be used. As gradients do not need to propagate through the words between sentences, the fusion layer 1204 further includes for distant supporting sentences to have a more direct interaction. With continuing reference to FIG. 12, there is shown an implementation of an input module 1200A, where a positional encoder 1208 implements the sentence reader 1202 and a bi-directional GRU 1206 comprises the input fusion layer 1204. Each sentence encoding $f_i$ is the output of an encoding scheme taking the word tokens $[w_1^i, \ldots, w_{M_i}^i]$, where $M_i$ is the length of the sentence.

For the positional encoding scheme, the sentence representation is produced by $f_i=\Sigma_M^{j=1}l_j \circ w_j^i$, where "∘" is element-wise multiplication and $l_j$ is a column vector with structure $$l_{jd} = \left(1 - \frac{j}{M}\right) - \left(\frac{d}{D}\right)\left(1 - \frac{2j}{M}\right),$$

where d is the embedding index and D is the dimension of the embedding.

The input fusion layer 1204 takes these input facts and enables an information exchange between them by applying a bidirectional GRU 1206.

$$\vec{f_i}=GRU_{fwd}(f_i, \vec{f_{i-1}})$$ Equation (34)

$$\overleftarrow{f_i}=GRU_{bwd}(f_i, \overleftarrow{f_{i+1}})$$ Equation (35)

$$\vec{\overleftrightarrow{f_i}} = \overleftarrow{f_i} + \vec{f_i}$$ Equation (36)

where $f_i$ is the input fact at timestep i, $\vec{f_i}$ is the hidden state of the forward GRU at timestep i, and $\overleftarrow{f_i}$ is the hidden state of the backward GRU at timestep I. This allows contextual information from both future and past facts to impact facts $\ddot{F}$. While positional encoding is used to illustrate the operation and function of the embodiment depicted by FIG. 12, the sentence reader 1202 could be based on any variety of encoding schemes. GRUs and LSTMs could be used as well however, these implementations require more computational resources and could be prone to overfitting if auxiliary tasks, such as reconstructing the original sentence, were not used.

Input Module for VQA

To apply the DMN to visual question answering, a novel input module for images is introduced. The module splits an image into small local regions and considers each region equivalent to a sentence in the input module for text.

The input module for VQA 1200B illustrated in FIG. 12 is comprised of layers, including a local region feature extraction 1234, a visual feature embedding 1224, and an input fusion layer 1214, corresponding to the input fusion layer 1204 described with reference to block 1200A.

Local Region Feature Extraction:

To extract features from the image, an embodiment uses a convolutional neural network based upon the VGG-19 model. According to this mechanism, the input image is rescaled to 448×448 and take the output from the last pooling layer which has dimensionality d=512×14×14. The pooling layer divides the image into a grid of 14×14, resulting in 196 local regional vectors of d=512.

Visual Feature Embedding:

As the VQA task involves both image features and text features, a novel linear layer is added in which tan h activation is used to project the local regional vectors to the textual feature space used by the question vector q.

Input Fusion Layer.

The local regional vectors extracted from above do not yet have global information available to them. Without global information, their representational power is quite limited, with simple issues like object scaling or locational variance causing accuracy problems. To solve this, a novel input fusion layer 1214, corresponding to input fusion layer 1204 of the textual input module 1200A. Accordingly, to produce the input facts F, the image 1211 is traversed 1236 in a snake like fashion in the visual feature extraction layer 1234, as depicted in block 1200B of FIG. 12 to produce input facts F 1221. Then a bi-directional GRU 1216 is applied over these input facts F to produce the globally aware input facts $\ddot{F}$ 1251. The bi-directional GRU 1216 enables information propagation from neighboring image patches, capturing spatial information. For further details describing the foregoing as well as other example embodiments, reference can be had to Ankit Kumar, Ozan Irsoy, Peter Ondruska, Mohit Iyyer, James Bradbury, Ishaan Gulrajani, Victor Zhong, Romain Paulus, Richard Socher; Ask Me Anything: Dynamic Memory Networks for Natural Language Processing (Submitted on Jun. 24, 2015 (v1), last revised Mar. 5, 2016) <accessible at http://arxiv.org/abs/1506.07285v5 as of May 30, 2016> and Caiming Xiong, Stephen Merity, Richard Socher; Dynamic Memory Networks for Visual and Textual Question Answering (Submitted on 4 Mar. 2016) <accessible at http://arxiv.org/abs/1603.01417v1 as of May 30, 2016> with are incorporated herein by reference in their entirety for all purposes.

Figure 13:
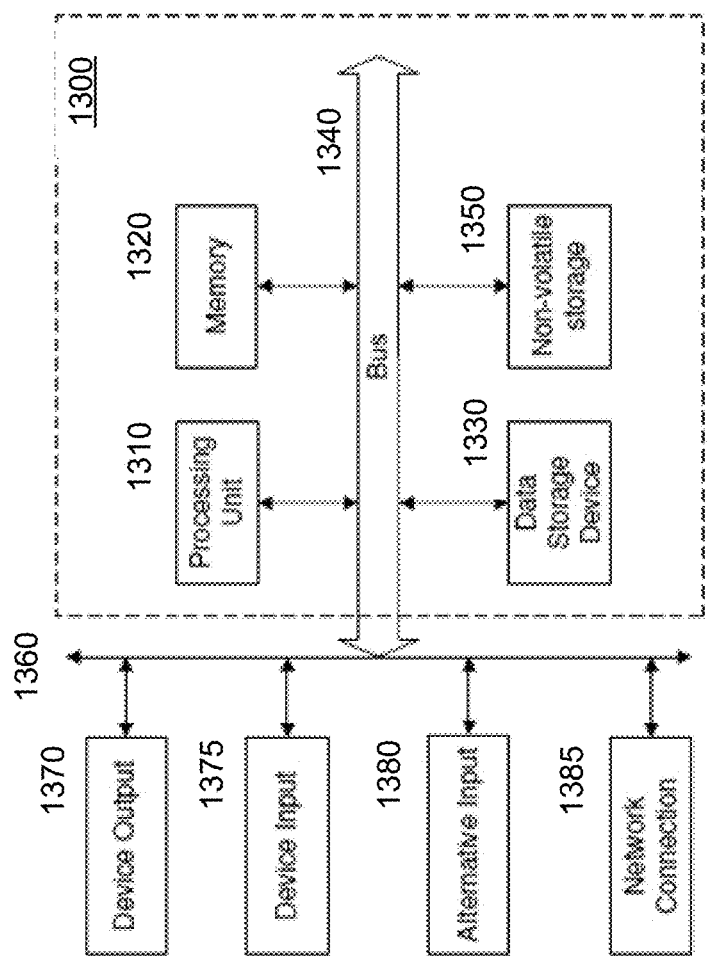
FIG. 13 is a block diagram of a computer system on which the present invention may be implemented.

FIG. 13 is a block diagram of a particular machine that may be used with the present invention. It will be apparent to those of ordinary skill in the art, however that other alternative systems of various system architectures may also be used. The data processing system illustrated in FIG. 13 includes a bus or other internal communication means 1340 for communicating information, and a processing unit 1310 coupled to the bus 1340 for processing information. The processing unit 1310 may be a central processing unit (CPU), a digital signal processor (DSP), or another type of processing unit 1310.

The system further includes, in one embodiment, a random access memory (RAM) or other volatile storage device 1320 (referred to as memory), coupled to bus 1340 for storing information and instructions to be executed by processor 1310. Main memory 1320 may also be used for storing temporary variables or other intermediate information during execution of instructions by processing unit 1310.

The system also comprises in one embodiment a read only memory (ROM) 1350 and/or static storage device 1350 coupled to bus 1340 for storing static information and instructions for processor 1310. In one embodiment, the system also includes a data storage device 1330 such as a magnetic disk or optical disk and its corresponding disk drive, or Flash memory or other storage which is capable of storing data when no power is supplied to the system. Data storage device 1330 in one embodiment is coupled to bus 1340 for storing information and instructions.

The system may further be coupled to an output device 1370, such as a cathode ray tube (CRT) or a liquid crystal display (LCD) coupled to bus 1340 through bus 1360 for outputting information. The output device 1370 may be a visual output device, an audio output device, and/or tactile output device (e.g. vibrations, etc.)

An input device 1375 may be coupled to the bus 1360. The input device 1375 may be an alphanumeric input device, such as a keyboard including alphanumeric and other keys, for enabling a user to communicate information and configuration selections to processing unit 1310. An additional user input device 1380 may further be included. One such user input device 1380 is cursor control device 1380, such as a mouse, a trackball, stylus, cursor direction keys, or touch screen, may be coupled to bus 1340 through bus 1360 for communicating direction information and configuration selections to processing unit 1310, and for controlling movement on display device 1370.

Another device, which may optionally be coupled to computer system 1300, is a network device 1385 for accessing other nodes of a distributed system via a network. The communication device 1385 may include any of a number of commercially available networking peripheral devices such as those used for coupling to an Ethernet, token ring, Internet, or wide area network, personal area network, wireless network or other method of accessing other devices. The communication device 1385 may further be a null-modem connection, or any other mechanism that provides connectivity between the computer system 1300 and the outside world.

Note that any or all of the components of this system illustrated in FIG. 13 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 1320, mass storage device 1330, or other storage medium locally or remotely accessible to processor 1310.

It will be apparent to those of ordinary skill in the art that the system, method, and process described herein can be implemented as software stored in main memory 1320 or read only memory 1350 and executed by processor 1310. This control logic or software may also be resident on an article of manufacture comprising a computer readable medium having computer readable program code embodied therein and being readable by the mass storage device 1330 and for causing the processor 1310 to operate in accordance with the methods and teachings herein.

The present invention may also be embodied in a handheld or portable device containing a subset of the computer hardware components described above. For example, the handheld device may be configured to contain only the bus 1340, the processor 1310, and memory 1350 and/or 1320.

The handheld device may be configured to include a set of buttons or input signaling components with which a user may select from a set of available options. These could be considered input device #1 1375 or input device #2 1380. The handheld device may also be configured to include an output device 1370 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 1310, a data storage device 1330, a bus 1340, and memory 1320, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 1385.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 1310. A machine-readable medium includes any mechanism for storing information in a form readable by a machine (e.g. a computer). For example, a non-transitory machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

Experimental Results of Exemplary Implementations

Figure 14:
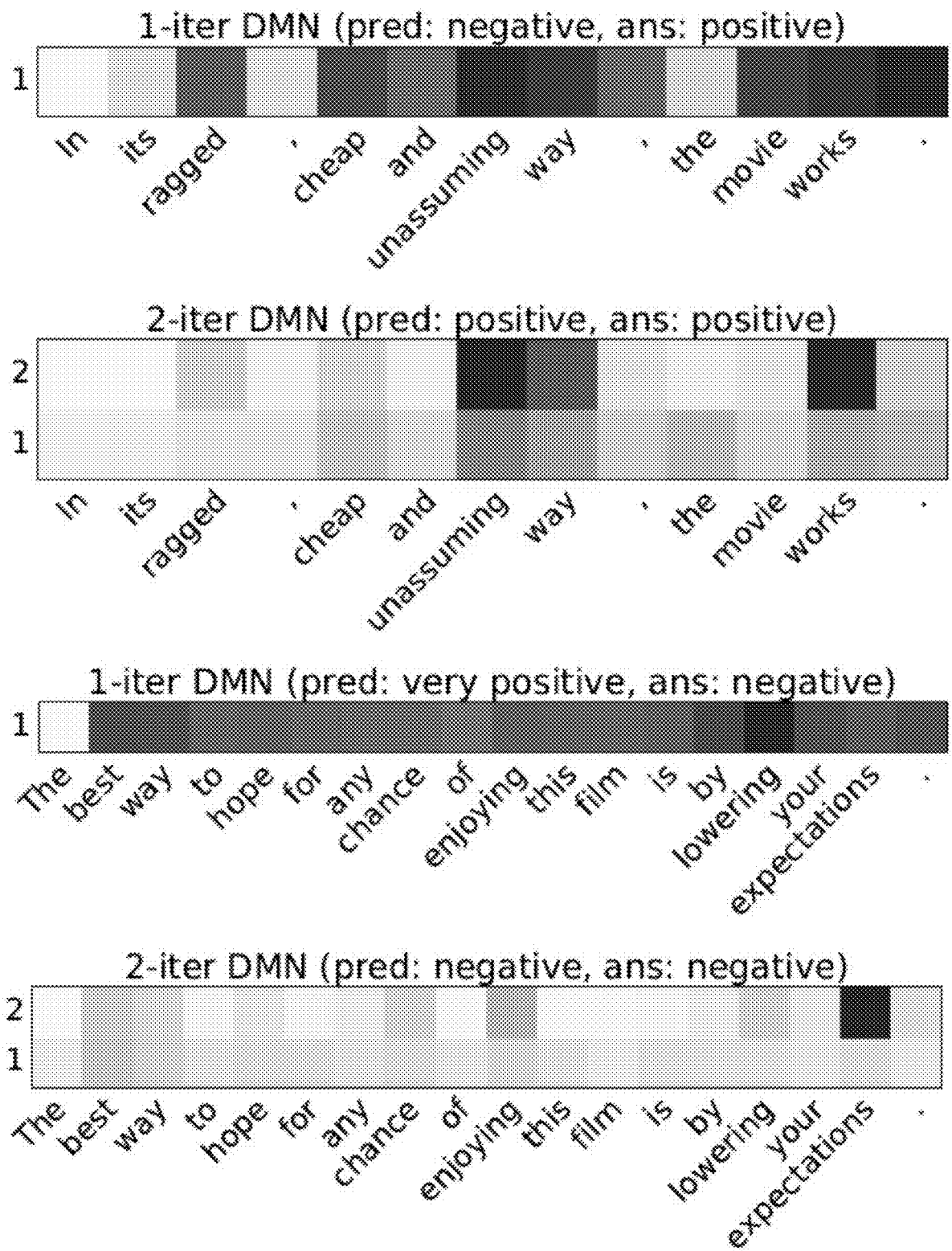
FIG. 14 illustrates attention weights for sentiment examples that were only labeled correctly by a particular DMN embodiment with two episodes.
Figure 15:
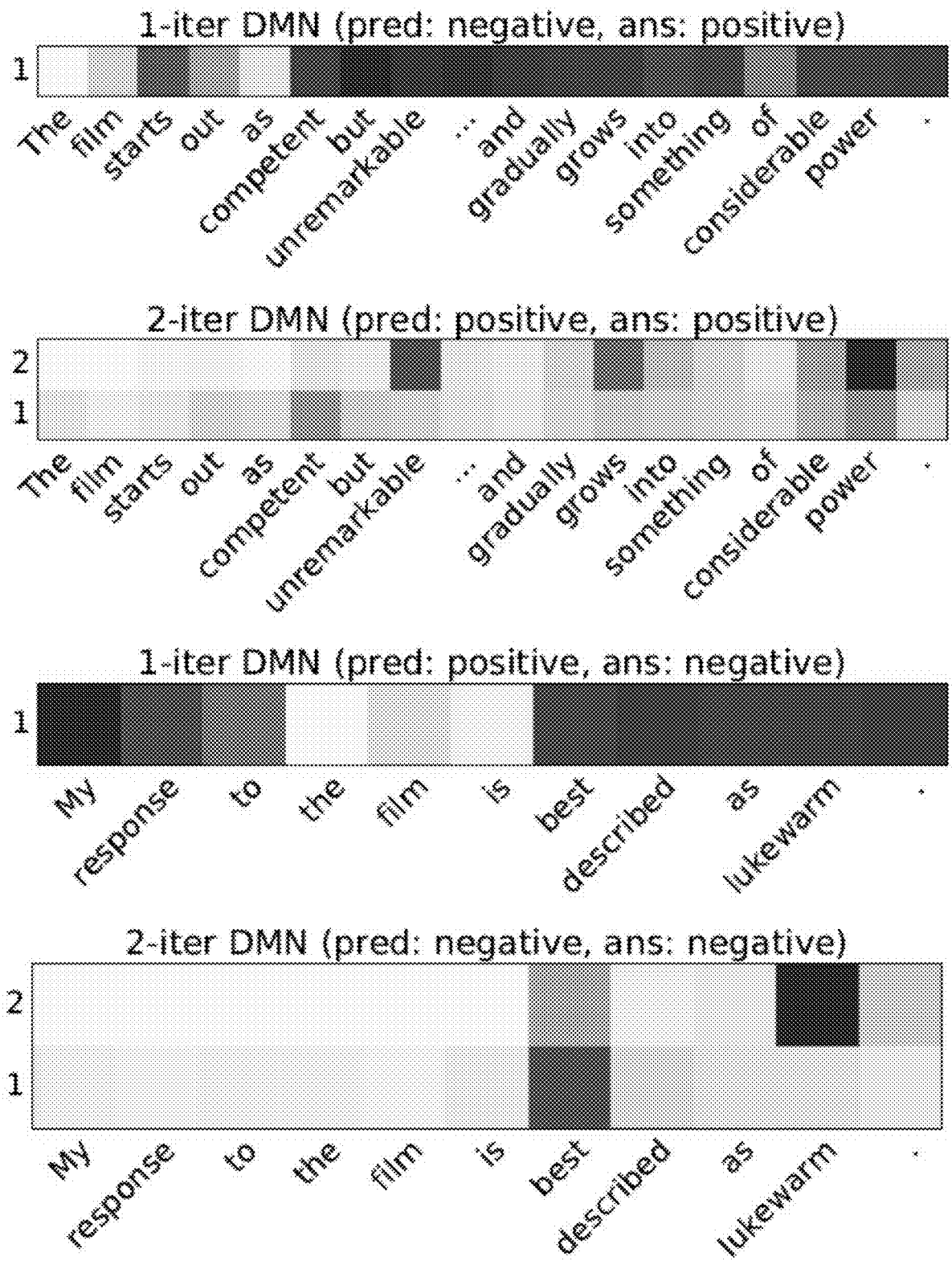
FIG. 15 illustrates sentences demonstrating cases where initially positive words lost their importance after a particular DMN embodiment determined sentiment for the entire sentence context.

Sentiment Analysis:

In a plurality of experiments, a DMN was trained with GRU sequence models and the episodic memory module was evaluated for sentiment analysis. Given that the DMN performs well with one iteration and two iterations, the study tested examples where the one-iteration DMN is incorrect and the two-iteration DMN is correct. FIG. 14 illustrates attention weights for sentiment examples that were only labeled correctly by a particular DMN embodiment with two episodes. The y-axis shows the episode number. This sentence demonstrates a case where the ability to iterate allows the DMN to sharply focus on relevant words. FIG. 15 illustrates sentences demonstrating cases where initially positive words lost their importance after a particular DMN embodiment determined sentiment for the entire sentence context either through a contrastive conjunction ('but") or a modified action "best described." Looking at the sentences in FIGS. 14 and 15, the following observations are made:

1. The attention of the two-iteration DMN is generally much more focused compared to that of the one iteration DMN. We believe this is due to the fact that with fewer iterations over the input, the hidden states of the input module encoder have to capture more of the content of adjacent time steps. Hence, the attention mechanism cannot only focus on a few key time steps. Instead, it needs to pass all necessary information to the answer module from a single pass.

2. During the second iteration of the two-iteration DMN, the attention becomes significantly more focused on relevant key words and less attention is paid to strong sentiment words that lose their sentiment in context. This is exemplified by the sentence in FIG. 15 that includes the very positive word "best." In the first iteration, the word "best" dominates the attention scores (darker color means larger score). However, once its context, "is best described", is clear, its relevance is diminished and "lukewarm" becomes more important.

We conclude that the ability of the episodic memory module to perform multiple passes over the data is beneficial. It provides significant benefits on harder bAbI tasks, which require reasoning over several pieces of information or transitive reasoning. Increasing the number of passes also slightly improves the performance on sentiment analysis, though the difference is not as significant.

Visual Question Answering (VQA):

FIG. 16 illustrates exemplary qualitative results of attention for a particular DMN embodiment performing visual question answering (VQA). In each pair, the original images are shown on the left image of the pair. On the right, a second image shows how the attention gate $g_i^t$ activates given one pass over the image and query. White regions are the most active. Answers are given by the DMN using an input fusion layer. The images in FIG. 16 illustrate how the attention gate $g_i^t$ selectively activates over relevant portions of the image according to the query.

Particular Implementations

In one implementation, the technology disclosed provides a method of building a model used by a machine to answer questions. The method can include loading into a memory, which is coupled to a processor, episodic memory code that implements a multi-layer neural network with model parameters used to process vector representations of questions against vector representations of input facts. Some layers in the neural network are connected through episodic memories. The episodic memory code can further include at least one input fact memory that stores a vector representation of input facts from which questions are answered. The episodic memory code can also include at least one question memory that stores a vector representation of a question at hand, a plurality of episodic memories to which attention gate weights are assigned, respectively, in a plurality of passes over the input facts, and an attention gate weight calculating code that applies a gating function to calculate attention gate weights and assign them to an episodic memory.

The method can also include training the model parameters using training examples of (input facts, question(s) and answer(s)). Each answer in a training example responds, respectively, to a question in the training example that can be answered based on input facts in the training example. The training can include repeating at least hundreds of times: (i) accessing a training example of (input facts, question(s) and answer(s)); (ii) beginning with a first question from the training example in the question memory to use applying the attention gate weight calculating code; (iii) in a first pass, applying the attention gate weight calculating code to evaluating the input facts in view of the question memory, calculating attention gate weights for the input facts, and assigning them to a first episodic memory; (iv) in one or more subsequent passes, applying the attention gate weight calculating code to evaluating the input facts in view of the question memory and the calculated attention gate weights in a most recent episodic memory, calculating new attention gate weights, and assigning them to a most recent episodic memory; (v) generating an answer to the question using the most recent episodic memory; and (vi) comparing the generated answer or the input facts indicated by the attention gate weights in the most recent episodic memory with the reference answer or a reference identification of relevant input facts in the training example and adjusting the model parameters to reduce error.

The method can further include storing the model parameters in a tangible storage medium for use by a machine when receiving and responding to questions.

Either of these methods can be combined with any of the features of the following methods or devices.

In another implementation, the technology disclosed provides a method of using a question-answering model embedded in a process machine to answer questions. The method can include loading into a memory, which is coupled to a processor, episodic memory code that implements a multi-layer neural network with model parameters used to process vector representations of questions against vector representations of input facts. Some layers in the neural network connected through episodic memories. The episodic memory code can further include at least one input fact memory that stores a vector representation of input facts from which questions are answered. The episodic memory code can also include at least one question memory that stores a vector representation of a question at hand, a plurality of episodic memories to which attention gate weights are assigned, respectively, in a plurality of passes over the input facts, and an attention gate weight calculating code that applies a gating function to calculate attention gate weights and assign them to an episodic memory.

The method can also include responding to a question at hand posed against the input facts using the model parameters. The responding can include accessing the vector representations of a first question in the question memory and the input facts in the input fact memory. The responding can also include in a first pass, applying the attention gate weight calculating code to evaluating the input facts in view of the question memory, calculating attention gate weights for the input facts, and assigning them to a first episodic memory. The responding can further include in one or more subsequent passes, applying the attention gate weight calculating code to evaluating the input facts in view of the question memory and the calculated attention gate weights in a most recent episodic memory, calculating new attention gate weights, and assigning them to a most recent episodic memory.

The method can further include outputting a final outcome from the episodic memory to an answer module that generates a sequence of one or more output labels responsive to the question.

In some implementations, the method further includes receiving sentences as input facts. Sometimes the method receives words as input facts. Some method implementations include receiving features of visual images as input facts.

In some implementations, the method further includes accessing semantic background facts in a semantic memory. The gate calculating code can be applied to evaluation of semantic background facts as well as the input facts in view of the first memory. The gate calculating code can be applied to evaluation of semantic background facts as well as the input facts in view of the most recent memory.

In some implementations, the method further includes receiving a question that requires transitive reasoning over the input facts. Sometimes the method receives a question that requires tagging of parts of speech in one or more of input facts. Some method implementations include receiving a question that requires sentiment analysis of one or more of the input facts. Further, in some implementations the method includes receiving a question that requires language translation of one or more of the input facts.

In a further implementation, the technology disclosed provides a processor-based device that includes a processor and memory coupled to the processor that implements a multi-layer neural network with model parameters trained to process questions against input facts. Some layers in the neural network connected through a gate attention means to form episodic memories. At least one input fact memory stores a vector representation of input facts from which questions are answered. At least one question memory that stores a vector representation of a question at hand. The device further includes a plurality of episodic memories to which attention gate weights are assigned, respectively, in a plurality of passes over the input facts. The gate attention means for applying a gating function to calculate attention gate weights in multiple passes over the input facts in view of contents of the question memory and, after a first pass, in view of contents of a most recent episodic memory.

The gate attention means includes the structures that iterate over or operate on the input facts in multiple passes and that apply the gate attention weight functions to update the episodic memory. By iterate, in the context of a multi-layer neural network, we mean accessing the input facts in each iteration. Multiple accesses to input facts may be sequential, without using an iterator, per se, to accomplish the multiple accesses.

This disclosure describes several gate attention weight functions that can be used by a gate attention means, including functions that use sigmoid, softmax and rectified linear unit (ReLU) calculations. Some of these functions are more fully described in the pair of papers (Ask Me Anything; and Dynamic Memory Networks for Visual and Textual Question Answering) that are incorporated by reference.

To answer some questions, only one pass is needed. In simple cases, the gate attention means reduces to applying a gate attention weight function in one pass. For instance, sometimes one sentence includes all the facts needed to respond to a question. Image processing may need only one pass through image regions, following input fusion. Part of speech tagging can be satisfactorily performed in one pass. Labelling objects in text can usually be done in one pass. More complicated questions require multiple passes. Many answers to questions require fact sequences and transitive reasoning, which is accomplished in multiple passes. The facts may be found in input facts, semantic memory or both. Sentiment analysis of artfully complex sentences can require two or more passes. In some contexts, apparent from claim language, gate attention means involve multiple passes and in other, also apparent contexts, one pass of applying a gate attention weight function can be called out.

The gate attention means assigns the calculated attention gate weights for a current pass to a current episodic memory and particular attention calculated gate weights indicate relevance of particular input facts. An output that sends a final outcome from the episodic memory to an answer module that generates a sequence of one or more output labels responsive to the question.

In some implementations, the processor-based device further includes a plurality of Gated Recurrent Unit structures, including with at least one attention gated memory cell per vector representation of input facts. The gate attention means can use the Gated Recurrent Unit structures to calculate attention gate weights and update the episodic memory.

In some implementations, the processor-based device further includes the Gated Recurrent Unit structure calculating the attention gate weights according to the equations:

$$z(s,m,q) = [s°q, s°m, |s-q|, |s-m|, s, m, q, s^T W^{(b)} q, s^T W^{(b)} m]$$

$$G(s,m,q) = \sigma(W^{(2)} \tan h(W^{(1)} z(s,m,q) + b^{(1)}) + b^{(2)})$$

where t is a time step, s is a sentence or word, m is a memory for a calculated coefficient of relevance for a sentence or word, t is a time step, q is the question, T is an upper bound of the input facts, $W^{(b)}$, $W^{(1)}$, $W^{(2)}$ are weight matrixes by training, $b^{(1)}$, $b^{(2)}$ are offsets by training, σ is a sigmoid activation function and a is an element-wise product.

In some implementations, the processor-based device further includes the Gated Recurrent Unit calculating the attention gate weights using a sigmoid activation function.

In some implementations, the processor-based device further includes the Gated Recurrent Unit structure calculating the attention gate weights according to the equations:

$$z_i^t = [\vec{f_i}°q; \vec{f_i}°m^{t-1}; |\vec{f_i} - q|; |\vec{f_i} - m^{t-1}|]$$

$$Z_i^t = W^{(2)} \tanh(W^{(1)} z_i^t + b^{(1)}) + b^{(2)}$$

$$g_i^t = \frac{\exp(Z_i^t)}{\sum_{k=1}^{M_i} \exp(Z_k^t)}$$

where t is a time step, $\vec{F} = [\vec{f_1}, \ldots, \vec{f_N}]$, $m^{t-1}$ is the episodic memory at a previous time step, q is the question, $W^{(1)}$, $W^{(2)}$ are weight matrixes, $b^{(1)}$, $b^{(2)}$ are offsets, ○ is an element-wise product, |·| is an element-wise absolute value, and ";" represents concatenation of vectors; and where a scalar value, the attention gate value $g_i^t$, is calculated using a softmax activation function and associated with each fact $\vec{f_i}$ during pass t.

In some implementations, the processor-based device further includes a Soft Attention structure coupled to the Gated Recurrent Unit structure of the gate attention means, where the Soft Attention structure produces a contextual vector $c^t$ from attention gate weights through a weighted summation of sorted list of vectors $\overleftarrow{f_i}$ and corresponding attention gates $g_i^t$:

$$c^t = \sum_{i=1}^{N} g_i^t \vec{f_i}.$$

In some implementations, the processor-based device further includes an Attention based Gated Recurrent Unit structure that controls updating of some hidden states in the multi-layer neural network according to the formulas:

$$\tilde{h}_i = \tan h(W_{x_i} + r_i ° U h_{i-1} + b^{(h)})$$

$$h_i = g_i^t ° \tilde{h}_i + (1 - g_i^t) ° h_{i-1}$$

where the gate attention means uses the Soft Attention structure to select the portions of the input facts with which to update the question memory.

In some implementations, the processor-based device further includes the Gated Recurrent Unit structure calculating the attention gate weights according to the equations:

$$m^t = \text{ReLU}(W^t[m^{t-1}; c^t; q] + b)$$

where ";" is a concatenation operator, $W^t \in \mathbb{R}^{n_H \times n_H}$, $b \in \mathbb{R}^{n_H}$, and $n_H$ is a hidden size, and ReLU is a function $f(x) = \max(0, x)$.

In some implementations, the processor-based device further includes a plurality of Long Short-Term Memory structures, including at least one gated memory cell per input fact; where the multi-layer neural network uses the Long Short-Term Memory structures to retain some hidden states of the neural network layers.

In some implementations, the processor-based device further includes the Long Short-Term Memory structure calculating some hidden states of the neural network layers according to the equations:

$$i_t = \sigma(W^{(i)}x_t + U^{(i)}h_{t-1})$$

$$f_t = \sigma(W^{(f)}x_t + U^{(f)}h_{t-1})$$

$$o_t = \sigma(W^{(o)}x_t + U^{(o)}h_{t-1})$$

$$\tilde{c}_t = \tan h(W^{(c)}x_t + U^{(c)}h_{t-1})$$

$$C_t = f_t \circ c_{t-1} + i_t \circ \tilde{c}_t$$

$$h_t = o_t \circ \tan h(h_t)$$

where t is a time step, $x_t$ is an input at the time step t, $W^{(i)}$, $W^{(f)}$, $W(\circ)$, $W^{(c)}$, $U^{(i)}$, $U^{(f)}$, $U^{(\circ)}$ and $U^{(c)}$ are weight matrixes by training, σ is a sigmoid activation function and ○ is an element-wise product.

In some implementations, the processor-based device further includes a plurality of Gated Recurrent Network structures, including with at least one gated memory cell per input fact; wherein the gate attention means uses the Gated Recurrent Unit structures to retain some hidden states of the neural network layers.

In some implementations, the processor-based device further includes the Gated Recurrent Network structure calculating some hidden states of the neural network layers according to the equations:

$$z_t = (W^{(z)}x_t + U^{(z)}h_{t-1} + b^{(z)})$$

$$r_t = \sigma(W^{(r)}x_t + U^{(r)}h_{t-1} + b^{(r)})$$

$$\tilde{h}_t = \tan h(Wx_t + r_t \circ Uh_{t-1} + b^{(h)})$$

$$h_t = z_t \circ h_{t-1} + (1-z_t) \circ \tilde{h}_t$$

where t is a time step, $x_t$ is an input at the time step t, $W^{(z)}$, $W^{(r)}$, W, $U^{(z)}$, $U^{(r)}$ and U are weight matrixes by training, $b^{(z)}$, $b^{(r)}$ and $b^{(h)}$ are offsets by training, σ is a sigmoid activation function and ○ is an element-wise product.

In some implementations, the processor-based device further includes an input fusion layer. The input fusion layer can include a sentence reader that encodes input words into a sentence embedding and a bidirectional Gated Recurrent Unit that operates on the sentence embedding to exchange information between neighboring sentences to produce the input facts.

In some implementations, the processor-based device further includes an input fusion layer. The input fusion layer can include a local region feature extractor that divides the image into local regions and embeds each local region into a vector. The device can further include a projection layer that projects embedded local regions to a textual feature space used by the vector representation of the question in the question memory. A bidirectional Gated Recurrent Unit that operates on the embedded local regions to exchange information between neighboring local regions to produce the input facts can also be included in the device. In some implementations of the processor-based device the projection layer includes a linear layer with a tan h activation function.

The technology in methods and devices described above also can be embodied in a tangible, machine readable storage medium or practiced as configuring a computer device by feeding it a transitory signal. The tangible, machine readable storage medium does not include a transitory signal. Use of the transitory signal to configure a computer device is method, while the tangible, machine readable storage medium is an article of manufacture. The tangible storage medium can contain either instructions that, when executed by a processor, carry out one of the methods described, or that, when installed on a computer device, produce one of the devices described. Similarly, loading instructions via a transitory signal can be part of a method that includes executing some of the instructions, or it can be part of a method that results in production of one of the devices described.

In the foregoing specification, the disclosed embodiments have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method of using a question-answering model embedded in a process machine to answer questions, the method including:
  receiving, at a question module configured to compute a representation of a question, a question posed against one or more input facts stored as vector representations of input facts at one or more input fact memories in an input encoding module, wherein the one or more input fact memories are sequentially connected, and at least one input fact memory stores an end-of-passes representation;
  accessing at least one question memory that stores a vector representation of the question at hand and a plurality of episodic memories to which attention gate weights are assigned;
  in a first pass sequentially traversing the one or more input fact memories:
    applying a gating function to the input facts and contents received directly from the question memory,
    calculating updated attention gate weights by iterating the input facts from the one or more input fact memories in the first pass, and
    assigning the updated attention gate weights to a first episodic memory in the input encoding module;
  in one or more subsequent passes each sequentially re-traversing the one or more input fact memories:
    applying the gating function to the input facts and contents received directly from the question memory and the updated attention gate weights from an episodic memory that has been updated from a most recent previous pass,
    re-calculating attention gate weights by re-iterating the input facts from the one or more input fact memories in each respective pass, and
    assigning the newly re-calculated attention gate weights to a most recent episodic memory in the input encoding module;
  updating a final hidden state of a gated recurrent unit (GRU) based on the newly re-calculated attention gate weights;
  computing an updated episodic memory vector for the respective episodic memory based on the newly re-calculated attention gate weights and a contextual vector generated by the updated final hidden state of the GRU during the respective pass; and completing the one or more subsequent passes when the end-of-passes representation is chosen as a most relevant fact during the respective pass; and outputting, upon completion of the one or more subsequent passes, a final outcome from the most recent episodic memory in the input encoding module to an answer module that is separate from the input encoding module, and that iteratively generates a sequence of one or more output labels responsive to the question.

2. The method of claim 1, further including receiving sentences as input facts.

3. The method of claim 1, further including receiving words as input facts.

4. The method of claim 1, further including receiving features of visual images as input facts.

5. The method of claim 1, further including:
accessing semantic background facts in a semantic memory; and
applying the attention gate weight calculating code to evaluation of semantic background facts as well as the input facts.

6. The method of claim 1, further including receiving a question that requires transitive reasoning over the input facts.

7. The method of claim 1, further including receiving a question that requires language translation of one or more of the input facts.

8. A processor-based device including:
a processor and memory coupled to the processor that implement:
a question module configured to compute a representation of a question, the question module receiving a question posed against one or more input facts stored as vector representations of input facts;
at least one input fact memory, in an input encoding module, that stores a vector representation of input facts from which questions are answered and an end-of-passes representation;
at least one question memory that stores a vector representation of the question at hand;
a plurality of episodic memories to which attention gate weights are assigned;
gate attention means for: in a first pass traversing the at least one input fact memory, applying a gating function to the input facts and contents received directly from the question memory to calculate updated attention gate weights by iterating the input facts from the at least one input fact memory, and
in one or more subsequent passes each re-traversing the at least one input fact memory, applying the gating function to the input facts and contents received directly from the question memory to re-calculate updated attention gate weights from an episodic memory that has been updated from a most recent previous pass;
wherein the gate attention means assigns the calculated attention gate weights for a current pass to a current episodic memory and particular attention calculated gate weights indicate relevance of particular input facts;
updating a final hidden state of a gated recurrent unit (GRU) based on the re-calculated attention gate weights, and
computing an updated episodic memory vector for the respective episodic memory based on the re-calculated attention gate weights and a contextual vector generated by the updated final hidden state of the GRU during the current pass; and
completing the one or more subsequent passes when the end-of-passes representation is chosen as a most relevant fact during the respective pass; and
an output that upon completion of the one or more subsequent passes, sends a final outcome from the most recent episodic memory in the input encoding module to an answer module that is separate from the input encoding module and that iteratively generates a sequence of one or more output labels responsive to the question.

9. The processor-based device of claim 8, further including:
a plurality of Gated Recurrent Unit structures, including with at least one attention gated memory cell per vector representation of input facts; and
wherein the gate attention means uses the Gated Recurrent Unit structures to calculate attention gate weights and update the episodic memory.

10. The processor-based device of claim 9, further including:
the Gated Recurrent Unit structure calculating the attention gate weights according to equations:

$$z(s,m,q)=[s \circ q, s \circ m, |s-q|, s-m|, s, m, q, s^T W^{(b)} q, s^T W^{(b)} m]$$

$$G(s,m,q)=\sigma(W^{(2)}\tan h(W^{(1)}z(s,m,q)+b^{(1)})+b^{(2)})$$

wherein $t$ is a time step, $s$ is a sentence or word, $m$ is a memory for a calculated coefficient of relevance for a sentence or word, $t$ is a time step, $q$ is the question, $T$ is an upper bound of the input facts, $W^{(b)}, W^{(1)}, W^{(2)}$ are weight matrixes by training, $b^{(1)}, b^{(2)}$ are offsets by training, $\sigma$ is a sigmoid activation function and $\circ$ is an element-wise product.

11. The processor-based device of claim 9, further including the Gated Recurrent Unit calculating the attention gate weights using a sigmoid activation function.

12. The processor-based device of claim 9, further including:
the Gated Recurrent Unit structure calculating the attention gate weights according to equations:

$$z_i^t = [\vec{f_i} \circ q; \vec{f_i} \circ m^{t-1}; |\vec{f_i} - q|; |\vec{f_i} - m^{t-1}|]$$

$$Z_i^t = W^{(2)}\tanh(W^{(1)}z_i^t + b^{(1)}) + b^{(2)}$$

$$g_i^t = \frac{\exp(Z_i^t)}{\sum_{k=1}^{M_i} \exp(Z_k^t)}$$

wherein t is a time step, $\vec{F} = [\vec{f_1}, \ldots, \vec{f_N}]$, $m^{t-1}$ is the episodic memory at a previous time step, q is the question, $W^{(1)}, W^{(2)}$ are weight matrixes, $b^{(1)}, b^{(2)}$ are offsets, $\circ$ is an element-wise product, $|\cdot|$ is an element-wise absolute value, and ";" represents concatenation of vectors; and
whereby a scalar value, an attention gate value $g_i^t$, is calculated using a softmax activation function and associated with each fact $\vec{f_i}$, during pass t.

13. The processor-based device of claim 12, further including:
a Soft Attention structure coupled to the Gated Recurrent Unit structure of the gate attention means, wherein the Soft Attention structure produces a contextual vector $c^t$ from attention gate weights through a weighted summation of sorted list of vectors $\vec{F}$ and corresponding attention gates $$g_i^t : c^t = \sum_{i=1}^{N} g_i^t \vec{f}_i.$$

14. The processor-based device of claim 12, further including:
an Attention based Gated Recurrent Unit structure that controls updating of some hidden states in the multi-layer neural network according to formulas:

$$\tilde{h}_i = \tan h(W_{x_i} + r_i \circ U h_{i-1} + b^{(h)})$$

$$h_i = g_i^{t} \circ \tilde{h}_i + (1 - g_i^{t}) \circ h_{i-1}$$

wherein the gate attention means uses a Soft Attention structure to select portions of the input facts with which to update the question memory.

15. The processor-based device of claim 9, further including:
the Gated Recurrent Unit structure calculating the attention gate weights according to equations:

$$m^t = \text{ReLU}(W^t[m^{t-1}; c^t; q] + b)$$

where ";" is a concatenation operator, $W^t \in \mathbb{R}^{n_H \times n_H}$, $b \in \mathbb{R}^{n_H}$, and $n_H$ is a hidden size, and ReLU is a function $f(x) = \max(0, x)$.

16. The processor-based device of claim 10, further including:
a plurality of Long Short-Term Memory structures, including at least one gated memory cell per input fact; and
wherein the multi-layer neural network uses the Long Short-Term Memory structures to retain some hidden states of the neural network layers.

17. The processor-based device of claim 16, further including:
the Long Short-Term Memory structure calculating some hidden states of the neural network layers according to equations:

$$i_t = \sigma(W^{(i)} x_t + U^{(i)} h_{t-1})$$

$$f_t = \sigma(W^{(f)} x_t + U^{(f)} h_{t-1})$$

$$o_t = \sigma(W^{(o)} x_t + U^{(o)} h_{t-1})$$

$$\tilde{c}_t = \tan h(W^{(c)} x_t + U^{(c)} h_{t-1})$$

$$C_t = f_t \circ c_{t-1} + i_t \circ \tilde{c}_t$$

$$h_t = o_t \circ \tan h(h_t)$$

wherein t is a time step, $x_t$ is an input at the time step t, $W^{(i)}$, $W^{(f)}$, $W^{(o)}$, $W^{(c)}$, $U^{(i)}$, $U^{(f)}$, $U^{(o)}$ and $U^{(c)}$ are weight matrixes by training, $\sigma$ is a sigmoid activation function and $\circ$ is an element-wise product.

18. The processor-based device of claim 10, further including:
a plurality of Gated Recurrent Network structures, including with at least one gated memory cell per input fact; and
wherein the gate attention means uses the Gated Recurrent Unit structures to retain some hidden states of the neural network layers.

19. The processor-based device of claim 18, further including:
the Gated Recurrent Network structure calculating some hidden states of the neural network layers according to equations:

$$z_t = (W^{(z)} x_t + U^{(z)} h_{t-1} + b^{(z)})$$

$$r_t = \sigma(W^{(r)} x_t + U^{(r)} h_{t-1} + b^{(r)})$$

$$\tilde{h}_t = \tan h(W x_t + r_t \circ U h_{t-1} + b^{(h)})$$

$$h_t = z_t \circ h_{t-1} + (1 - z_t) \circ \tilde{h}_t$$

where t is a time step, $x_t$ is an input at the time step t, $W^{(z)}$, $W^{(r)}$, $W$, $U^{(z)}$, $U^{(r)}$ and $U$ are weight matrixes by training, $b^{(z)}$, $b^{(r)}$ and $b^{(h)}$ are offsets by training, $\sigma$ is a sigmoid activation function and $\circ$ is an element-wise product.

20. The processor-based device of claim 10, further including:
an input fusion layer including:
a bidirectional Gated Recurrent Unit that operates on a sentence embedding formed by a sentence reader to exchange information between neighboring sentences to produce the input facts.

21. The processor-based device of claim 10, further including:
an input fusion layer including:
a local region feature extractor that divides an image into local regions and embeds each local region into a vector;
a projection layer that projects embedded local regions to a textual feature space used by the vector representation of the question in the question memory; and
a bidirectional Gated Recurrent Unit that operates on the embedded local regions to exchange information between neighboring local regions to produce the input facts.

22. The processor-based device of claim 21, wherein the projection layer includes a linear layer with a tanh activation function.

23. A method comprising:
receiving, at a question module configured to compute a representation of a question, a question posed against one or more input facts stored as vector representations of input facts at a plurality of input fact memories in an input encoding module, wherein the plurality of input fact memories are sequentially connected and at least one input fact memory stores an end-of-passes representation;
storing a vector representation of the question at a question memory;
in a first pass sequentially traversing the plurality of input fact memories:
applying a gating function to the input facts in the one or a plurality of ore input fact memories and a current copy of the vector representation of the question in the question memory,
calculating, based on application of the gating function, attention gate weights by iterating the input facts from the a plurality of input fact memories in the first pass, and
assigning the attention gate weights to a first episodic memory in the input encoding module;
in one or more subsequent passes each sequentially re-traversing the plurality of input fact memories:

re-applying the gating function to the input facts and updated attention gate weights from an episodic memory that has been updated from a most recent previous pass, re-calculating new attention gate weights by re-iterating the input facts from the a plurality of input fact memories in each respective pass, and assigning the newly re-calculated attention gate weights to a most recent episodic memory in the input encoding module;

updating a final hidden state of a gated recurrent unit (GRU) based on the newly re-calculated attention gate weight, and computing an updated episodic memory vector for the respective episodic memory based on the newly re-calculated attention gate weights and a contextual vector generated by the updated final hidden state of the GRU during the respective pass; and completing the one or more subsequent passes when the end-of-passes representation is chosen as a most relevant fact during the respective pass; and upon completion of the one or more subsequent passes, outputting a final outcome from the most recent episodic memory in the input encoding module to an answer module that is separate from the input encoding module.

* * * * *